(12) United States Patent
Oczkowski et al.

(10) Patent No.: US 10,148,495 B1
(45) Date of Patent: Dec. 4, 2018

(54) REMOTE CONFIGURATION OF WIRELESS DEVICES

(71) Applicant: AMAZON TECHNOLOGIES, INC., Reno, NV (US)

(72) Inventors: Sean Joseph Henry Oczkowski, Seattle, WA (US); Richard William Mincher, Cupertino, CA (US); David George Butler, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 891 days.

(21) Appl. No.: 14/299,608

(22) Filed: Jun. 9, 2014

(51) Int. Cl.
*H04L 12/24* (2006.01)
*H04L 29/06* (2006.01)
*G06F 17/22* (2006.01)
*H04W 8/20* (2009.01)
*H04L 29/08* (2006.01)

(52) U.S. Cl.
CPC ...... *H04L 41/0806* (2013.01); *G06F 17/2247* (2013.01); *H04L 41/0866* (2013.01); *H04L 63/08* (2013.01); *H04L 63/18* (2013.01); *H04L 67/30* (2013.01); *H04W 8/20* (2013.01)

(58) Field of Classification Search
CPC ..... H04L 63/08; H04L 12/6418; H04L 12/66; H04L 63/0272; H04L 63/101; H04L 63/108; H04L 67/12; H04L 41/0803; H04L 41/0806; H04L 41/0866; H04L 63/18; G06F 17/2247; G06F 21/629; G06F 2221/2141; G06F 8/61; H04W 84/22; H04W 8/20; H04W 8/265
See application file for complete search history.

(56) References Cited

U.S. PATENT DOCUMENTS

| | | | | |
|---|---|---|---|---|
| 7,010,365 | B2* | 3/2006 | Maymudes | G05B 15/02 455/231 |
| 7,930,369 | B2* | 4/2011 | Marriott | G06F 3/1423 369/24.01 |
| 8,078,685 | B2* | 12/2011 | Marriott | H04L 67/04 709/203 |
| 8,396,948 | B2* | 3/2013 | Marriott | H04L 67/08 709/203 |
| 8,966,601 | B2* | 2/2015 | Green | H04W 12/04 380/270 |
| 9,092,972 | B2* | 7/2015 | Lai | G08C 17/02 |
| 9,301,141 | B1* | 3/2016 | Mincher | H04L 63/062 |
| 9,563,626 | B1* | 2/2017 | Baranowski | G06F 17/30 |

(Continued)

*Primary Examiner* — Ramy M Osman
(74) *Attorney, Agent, or Firm* — Lindauer Law, PLLC

(57) ABSTRACT

Techniques are described for presenting data received from a headless device in an application served from distributed computing device(s), and using the application to generate data for configuring and registering the headless device. The headless device may have limited or absent display capabilities and the data may be employed to configure the headless device for wireless communication with other devices. The application may execute on a user device that communicates with the headless device over a wireless access point incorporated into the headless device. The data received from the headless device may be integrated into the application provided by the distributed computing devices(s), to enable updates to the appearance or user experience of the application without updating software on the headless device.

20 Claims, 12 Drawing Sheets

(56) References Cited

U.S. PATENT DOCUMENTS

| | | | | |
|---|---|---|---|---|
| 9,578,511 | B2* | 2/2017 | Kashef | H04L 41/0806 |
| 2005/0038875 | A1* | 2/2005 | Park | H04L 67/125 |
| | | | | 709/219 |
| 2006/0065709 | A1* | 3/2006 | Yamashita | H04M 1/72533 |
| | | | | 235/375 |
| 2006/0067295 | A1* | 3/2006 | Lehotsky | H04W 28/18 |
| | | | | 370/351 |
| 2007/0088806 | A1* | 4/2007 | Marriott | G06F 3/1423 |
| | | | | 709/217 |
| 2008/0188870 | A1* | 8/2008 | Andre | A61B 34/35 |
| | | | | 606/130 |
| 2009/0118848 | A1* | 5/2009 | Santinato | F24C 7/082 |
| | | | | 700/90 |
| 2009/0193507 | A1* | 7/2009 | Ibrahim | H04L 63/0807 |
| | | | | 726/9 |
| 2010/0165879 | A1* | 7/2010 | Gupta | H04L 67/306 |
| | | | | 370/254 |
| 2011/0167140 | A1* | 7/2011 | Marriott | G06F 3/1423 |
| | | | | 709/220 |
| 2011/0277019 | A1* | 11/2011 | Pritchard, Jr. | H04L 63/0815 |
| | | | | 726/4 |
| 2011/0294490 | A1* | 12/2011 | Faenger | H04L 67/025 |
| | | | | 455/419 |
| 2012/0124157 | A1* | 5/2012 | Marriott | H04L 67/34 |
| | | | | 709/208 |
| 2013/0014232 | A1* | 1/2013 | Louboutin | H04L 63/18 |
| | | | | 726/5 |
| 2013/0174043 | A1* | 7/2013 | Marriott | H04L 67/04 |
| | | | | 715/735 |
| 2013/0252583 | A1* | 9/2013 | Brown | H04L 63/107 |
| | | | | 455/411 |
| 2013/0286889 | A1* | 10/2013 | Cherian | H04L 63/18 |
| | | | | 370/254 |
| 2013/0347130 | A1* | 12/2013 | Sima | G06F 21/6209 |
| | | | | 726/29 |
| 2014/0006569 | A1* | 1/2014 | Ferrazzini | H04L 12/2809 |
| | | | | 709/220 |
| 2014/0047322 | A1* | 2/2014 | Kim | G06F 17/2247 |
| | | | | 715/234 |
| 2014/0157392 | A1* | 6/2014 | Smith | H04L 63/08 |
| | | | | 726/9 |
| 2014/0165165 | A1* | 6/2014 | Story, Jr. | H04L 63/08 |
| | | | | 726/6 |
| 2014/0247943 | A1* | 9/2014 | Harkins | G06F 9/4411 |
| | | | | 380/282 |
| 2014/0267934 | A1* | 9/2014 | Hardin | G08C 17/02 |
| | | | | 348/734 |
| 2014/0302842 | A1* | 10/2014 | Lloyd | H04L 41/0806 |
| | | | | 455/426.1 |
| 2014/0310349 | A1* | 10/2014 | Rainisto | G06Q 50/01 |
| | | | | 709/204 |
| 2015/0023183 | A1* | 1/2015 | Ilsar | H04W 48/08 |
| | | | | 370/244 |
| 2015/0023336 | A1* | 1/2015 | Ilsar | H04W 48/20 |
| | | | | 370/338 |
| 2015/0113627 | A1* | 4/2015 | Curtis | H04L 63/06 |
| | | | | 726/10 |
| 2015/0143467 | A1* | 5/2015 | Hebert | H04L 67/10 |
| | | | | 726/4 |
| 2015/0201022 | A1* | 7/2015 | Kim | H04L 67/12 |
| | | | | 709/203 |
| 2015/0249672 | A1* | 9/2015 | Burns | H04L 12/66 |
| | | | | 726/4 |
| 2015/0261876 | A1* | 9/2015 | Trikha | G06F 17/30896 |
| | | | | 715/234 |
| 2015/0351096 | A1* | 12/2015 | Sidhu | H04W 72/0453 |
| | | | | 370/329 |
| 2016/0012152 | A1* | 1/2016 | Johnson | G06F 17/30958 |
| | | | | 707/798 |
| 2016/0294837 | A1* | 10/2016 | Turgeman | H04L 63/102 |

* cited by examiner

US 10,148,495 B1

REMOTE CONFIGURATION OF WIRELESS DEVICES

BACKGROUND

In a home, business, or other environment, computing devices may interact with one another over any number of networks. In some cases, the computing devices may include smart appliances, Internet of Things devices, or other types of devices that may lack a display, or that may otherwise have limited capabilities for presenting information to and receiving input from a user. In such cases, configuring the device may be difficult given its limited interface.

Figure 1:
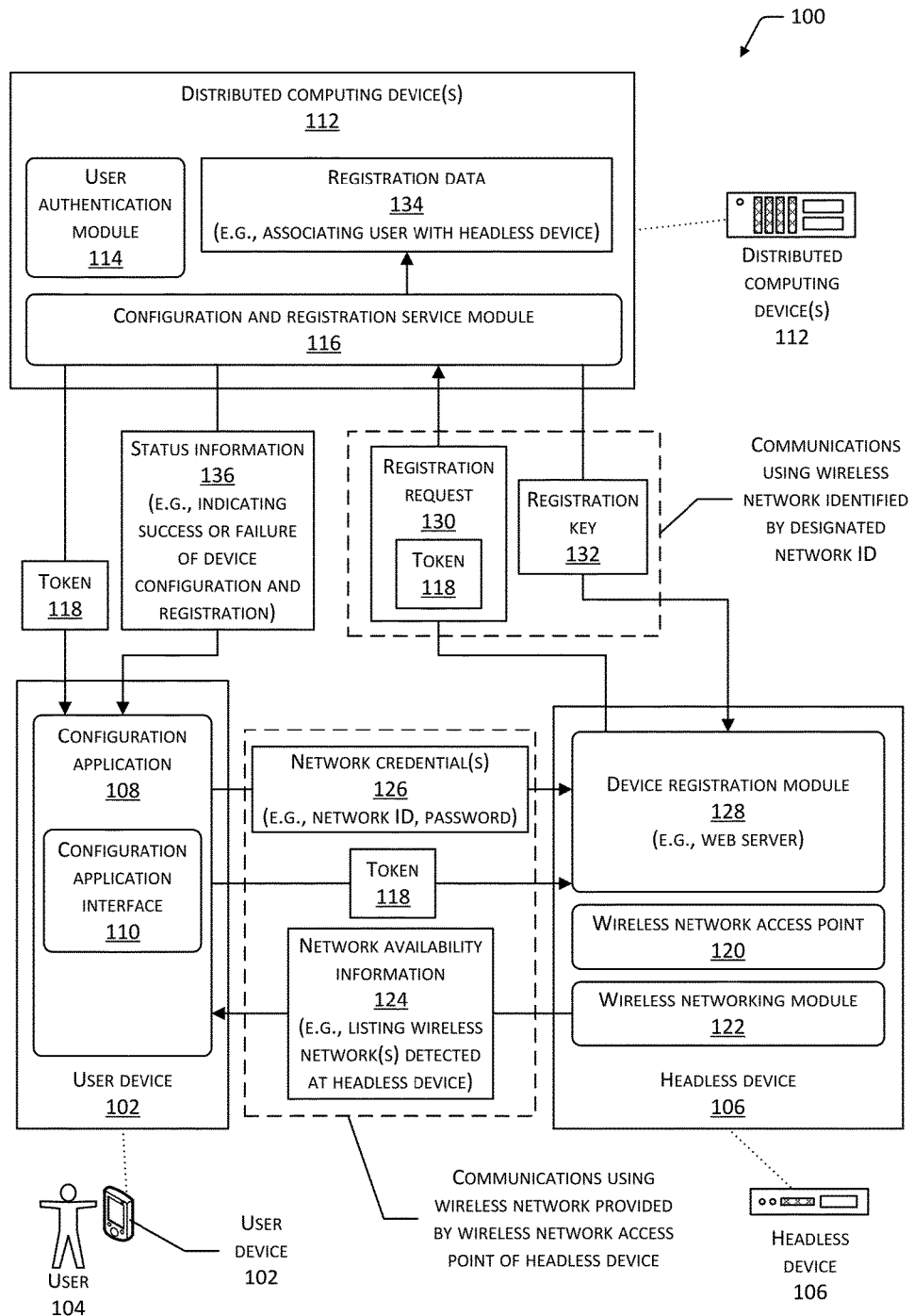
FIG. 1 depicts an environment for configuring and registering a headless device (e.g., a device that lacks a display), the environment including a user device that is employable by a user to configure the headless device and distributed computing devices that store registration information for the headless device.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for presenting data in an application served from one or more distributed computing devices, wherein the presented data is received from a device to be configured and registered using the application. In some implementations, the data received from the device may be employed to determine a network configuration for the device to enable its wireless communication with other devices. The data received from the device may be integrated into the application using a technique that substantially preserves the arrangement of user interface (UI) elements of the application. Accordingly, implementations enable updates to be made to the appearance or user experience of the application without updating software on the headless device.

In some cases, the device to be configured may be a headless device that lacks a display or that otherwise has limited capabilities for displaying information to a user. For example, the device to be configured may lack a display but may include light-emitting diodes (LEDs), speakers, haptic actuators, or other components for providing output to a user. In some cases, the device to be configured may include one or more hardware components for receiving audio input (e.g., microphone(s)). The device may also include software modules for analyzing and interpreting audio input (e.g., speech recognition software). Accordingly, the device to be configured may be arranged to accept speech input commands from a user. Moreover, the device to be configured may also include any number of buttons or other physical input components for accepting inputs from a user. In some cases, the device to be configured may include a scanner or sensor arranged to perform a scan in an optical frequency range or other electromagnetic frequency range. The scanner may be arranged to scan a one dimensional barcode, a multi-dimensional or matrix barcode, text data, or any other machine-readable representation of data. In some cases, the device to be configured may be employable by a user to specify, through voice input or optical barcode scan, products to be added to a shopping cart associated with the user.

Implementations enable a device with limited or absent display capabilities to be remotely configured by a user employing a UI that is provided by a configuration application communicated from one or more distributed computing devices. Alternatively, the UI may be that of a native application executing on a user device. The distributed computing device(s) may include computing device(s) that are located at location(s) that are remote from the user device, and that are in communication with the user device over one or more networks. During the configuration of the device, the UI may enable the user to specify a wireless network to be employed during subsequent communications by the device. Implementations also provide for the registration of the device using a token that is associated with a user. The token may be generated by a service executing on one or more distributed computing devices. In some implementations, the token be associated with a user who is authenticated to the service. The token may be communicated to the device to be registered, and the device may then use the token to register itself with the service. Because the token is associated with the user, employing the token during the device registration may enable an association to be registered between the device and the user. Subsequent transactions involving the device may then be associated with the user, without the need to store a user identification or user credentials on the device.

FIG. 1 depicts an environment 100 including a user device 102. The user device 102 may be any type of computing device, including but not limited to a personal computer, a smartphone, a tablet computer, a wearable computer, an implanted computer, a mobile gaming device, an electronic book reader, an automotive computer, a desktop computer, a laptop computer, a game console, a home entertainment device, and so forth. Although examples herein may describe the user device 102 as a physically separate device, implementations are not so limited. In some cases, the user device 102 may include one or more of a virtual computing environment, a hypervisor, a device emulation, or a virtual machine executing on one or more physical computing devices. The user device 102 is described further with reference to FIG. 4.

The user device 102 may be employed by a user 104 to configure, register, or otherwise determine operations to be performed by a headless device 106. Although examples herein may describe the headless device 106 as lacking a display, implementations are not so limited. In some cases, the headless device 106 may include a display with limited display functionality, such as a display that is smaller than a display typically included in a mobile computing device such as a tablet computer, smartphone, and so forth. In some cases, the headless device 106 may include one type of display such as a segmented display configured to present numeric characters, alphanumeric characters, or other glyphs, and the headless device 106 may not include another type of display such as a two-dimensional liquid crystal display (LCD) or electronic paper display. In some cases, the headless device 106 may include a display that is unavailable, obstructed, or not operational during a period of time when the headless device 106 is being configured, registered, or otherwise used. Accordingly, implementations enable the use of a user device 102 to configure and register a headless device 106, where the headless device 106 may have different (e.g., more limited) display capabilities than the user device 102.

Moreover, in some cases the user device 102 and the headless device 106 may have different input capabilities. For example, the user device 102 may enable the user 104 to input information via a touch screen, keyboard, mouse, stylus, voice input, haptic input, and so forth, whereas the headless device 106 may enable the user 104 to input information via voice input or via an optical scanner. Accordingly, implementations enable the use of the input capabilities of the user device 102 to configure and register the headless device 106, which may have more limited input capabilities than the user device 102.

The headless device 106 may include various components for presenting audio, visual, or haptic output to the user 104. For example, the headless device 106 may include audio output components such as speakers, visible output components such as LEDs, or haptic output components such as motion (e.g., vibration) actuators. In some cases, the headless device 106 may be configured to alter its shape, mechanically or otherwise, to convey information to the user 104. In some implementations, the headless device 106 may include a scanner component to optically scan one dimensional barcodes, multi-dimensional or matrix barcodes, text, or other machine-readable representations of information. The headless device 106 may also include hardware component(s) for receiving audio input (e.g., microphone(s)), and may execute speech recognition software to interpret voice inputs. The headless device 106 is described further with reference to FIG. 5.

In some implementations, the user device 102 may execute a configuration application 108 including a configuration application interface 110. The configuration application interface 110 may provide a UI, such as a graphical UI or command-line UI. Through the configuration application interface 110, the user 104 may instruct the configuration application 108 to perform operations to configure the headless device 106 and to register the headless device 106 with one or more services executed by one or more distributed computing devices 112. In some implementations, the configuration application 108 may be a web application that is provided by web server(s) executing on the distributed computing device(s) 112 and that is presented to the user 104 through a web browser executing on the user device 102. In such cases, the configuration application 108 may be described using a programming language such as any version of Hypertext Markup Language (HTML), Dynamic HTML (DHTML), Extensible Markup Language (XML), Extensible HTML (XHTML) and so forth. The configuration application 108 may also include dynamic content described using a programming language, including any version of JavaScript™, VBScript™, Per™, Common Gateway Interface (CGI), Cascading Style Sheets (CSS), other types of style sheets, and so forth. Implementations support the use of any web browser to present the configuration application 108.

In some implementations, the configuration application 108 may be a native application. A native application may be written using any compiled or interpreted programming language, including but not limited to Java™, Objective-C™, C++, and so forth. A native application may be designed and written to be executed by the processor(s) of the user device 102, within an operating system of the user device 102, and at least partly outside of a web browser.

The distributed computing device(s) 112 may include any type of computing device, including but not limited to a network computer, a cloud computing device, a server computer, a mainframe computer, or any of the types of computing devices listed with reference to the user device 102. In some cases, two or more of the distributed computing devices 112 may comprise a cluster, cloud, farm, or other grouping of multiple devices that coordinate operations to provide load balancing, failover support, parallel processing capabilities, shared storage resources, or other aspects. Although examples herein may describe the distributed computing device(s) 112 as physically separate devices, implementations are not so limited. In some cases, the distributed computing device(s) 112 may include one or more of a virtual computing environment, a hypervisor, a device emulation, or a virtual machine executing on one or more physical computing devices. The distributed computing device(s) 112 are described further with reference to FIG. 6.

To initiate the configuration and registration of the headless device 106, the user 104 may employ the configuration application 108 to login to a user authentication module 114 executing on the distributed computing device(s) 112. The user 104 may provide one or more credentials that enable the user authentication module 114 to authenticate the user 104. The credential(s) may include, but are not limited to, one or more of a username, password, digital certificate, passcode, challenge question response, and so forth. If the authentication of the user 104 is successful, the user 104 may then be provided access to one or more services executing on the distributed computing device(s) 112, such as a configuration and registration service module 116.

In some implementations, the user 104 may employ the configuration application 108 to request a token 118 from the configuration and registration service module 116, the token 118 to be used to register the headless device 106. The token 118 may be a digital sequence of information that includes any amount of data in any format. In some implementations, the token 118 may be associated with the user 104. For example, the token 118 may include information that identifies the user 104. Alternatively, the distributed computing device(s) 112 may store, in memory, a table or other data structure that relates one or more tokens 118 to one or more users 104. For example, the token 118 may be a randomly or pseudo-randomly generated sequence of information that is associated with the user 104 in a table stored in memory that is accessible to processes executing on the distributed computing device(s) 112. In some implementations, each token 118 may be uniquely associated with a single user 104. In some cases, the token 118 may be unique to the particular communication session in which the user 104 requests the token 118, such as a Hypertext Transfer Protocol (HTTP) session or HTTP Secure (HTTPS) session. In some implementations, the token 118 may be associated with a predetermined expiration time, time-to-live (TTL), or timeout. For example, the token 118 may expire ten minutes, thirty minutes, or one hour from the time when the token 118 is generated or from the time when the token 118 is communicated to the user device 102. The token 118 may be unique within the time period before it expires. In some cases, the token 118 may be generated using a random or pseudo-random algorithm, such that the token 118 does not include any information that enables an unauthorized entity to determine the identity of the user 104 based on the token 118.

The configuration and registration service module 116 may provide the token 118 to the configuration application 108 executing on the user device 102. After receiving the token 118, the configuration application 108 may establish a network connection with the headless device 106. In some cases, the network connection may be established over a wireless network provided by a wireless network access point 120 that is incorporated into the headless device 106. For example, the headless device 106 may provide a wireless network using the wireless network access point 120 that complies with one or more versions of the Institute of Electrical and Electronic Engineers (IEEE) 802.11 standard for wireless communications. Alternatively, the headless device 106 may communicate with the user device 102 or other devices using any other type of wired or wireless network, such as a wireless network that conforms to a version of the Bluetooth™ standard managed by the Bluetooth Special Interest Group.

The wireless network broadcast from the headless device 106 may be identified by a service set identification (SSID) that is broadcast. Alternatively, the wireless network may be a closed or hidden network such that its SSID is not broadcast. In some implementations, the user 104 may instruct the headless device 106 to enter a configuration mode by pressing one or more (e.g., two) buttons on the headless device 106 simultaneously or in a predetermined order. Alternatively, the headless device 106 may be configured to accept a voice command that instructs the headless device 106 to enter the configuration mode. While in the configuration mode, the wireless network access point 120 on the headless device 106 may be activated to provide its wireless network.

In some cases, the configuration application 108 may be written to describe or otherwise include the particular SSID of the wireless network broadcast from the headless device 106. In such cases, the configuration application 108 may automatically instruct the network interface of the user device 102 to connect to the wireless network broadcast by the headless device 106. The automatic connection of the network interface to the wireless network may be performed by the configuration application 108 or by a process spawned by the configuration application 108, and may occur at least partly without intervention by the user 104. Alternatively, the user 104 may examine a list of wireless networks to find the particular wireless network broadcast from the headless device 106, and the user 104 may manually switch the network interface of the user device 102 to connect to that wireless network. Implementations support the use of any wireless network security, including but not limited to one or more of Wi-Fi Protected Access (WPA), Wi-Fi Protected Access II (WPA2), Wired Equivalent Privacy (WEP), Extensible Authentication Protocol (EAP), Temporal Key Integrity Protocol (TKIP), Counter Cipher Mode Protocol (CCMP), and so forth. Implementations also support the use of an unsecured or unencrypted network connection between the user device 102 and the headless device 106.

In some implementations, the configuration application 108 may send a message to the headless device 106 requesting a list of wireless networks detected at the headless device 106. In response to the request, a wireless networking module 122 executing on the headless device 106 may scan for wireless networks having a signal strength such that they are detectable at the headless device 106. The wireless networking module 122 may send network availability information 124 to the configuration application 108, the network availability information 124 listing the one or more wireless networks detected during the scan. In some cases, the wireless networking module 122 may have previously scanned for available wireless networks in proximity to the headless device 106. In such cases, the wireless networking module 122 may send the previously determined network availability information 124 in response to the request from the configuration application 108.

Figure 2:
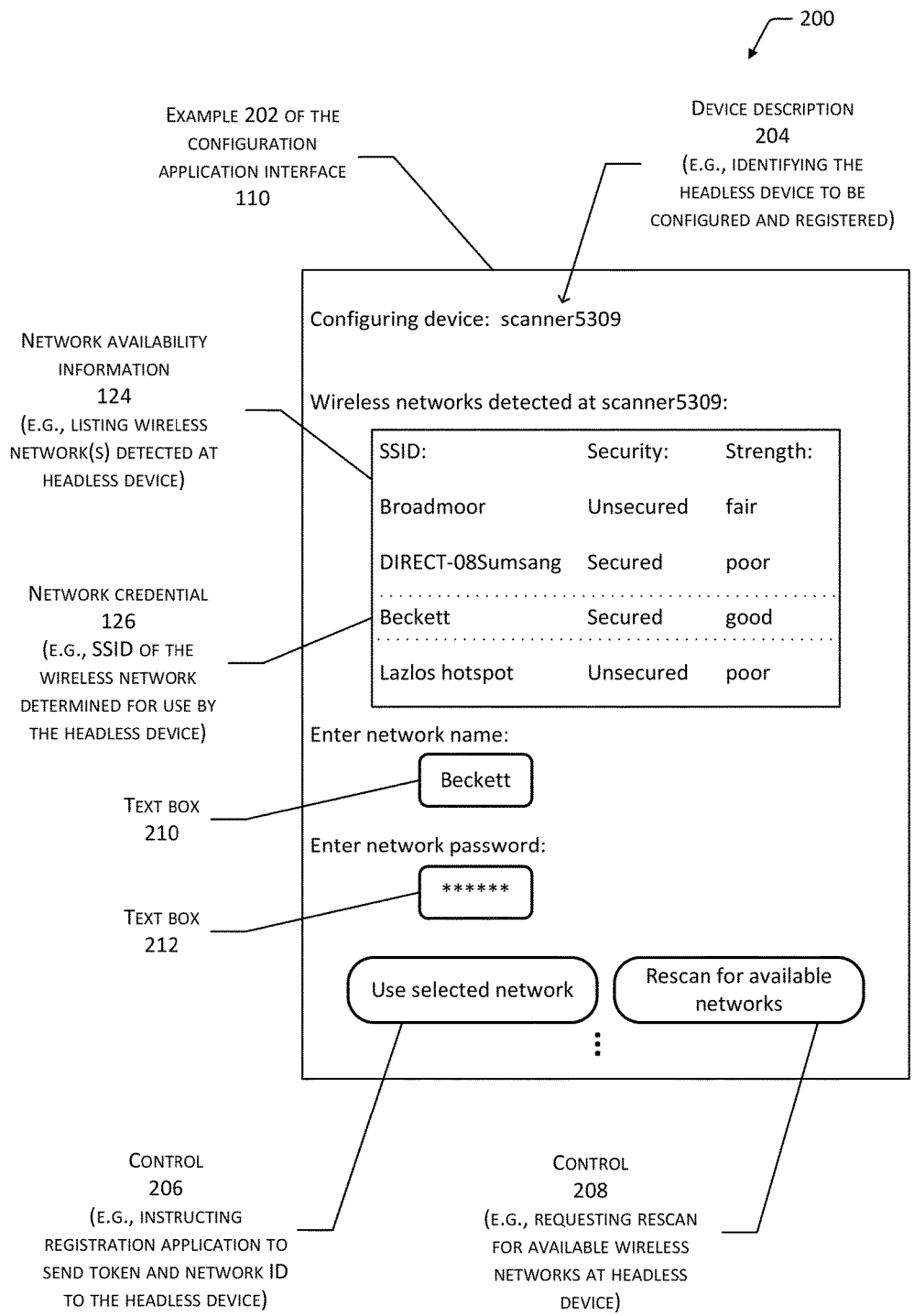
FIG. 2 depicts an example of a user interface that may be presented on a user device for configuring a headless device.

On receiving the network availability information 124, the configuration application 108 may present the network availability information 124 to the user 104 through the configuration application interface 110. FIG. 2 depicts a schematic 200 showing an example 202 of the configuration application interface 110. As shown in the example 202, the configuration application interface 110 may include a device description 204 that identifies or otherwise describes the headless device 106 to be configured and registered. The device description 204 may provide a device name (e.g., "scanner5309") or other information that identifies the headless device 106. The configuration application interface 110 may also present the list of detected wireless networks included in the network availability information 124. The configuration application interface 110 may enable the user 104 to select, from the list of detected wireless networks, a network identifier (ID) of a particular wireless network to be employed for network communication by the headless device 106. The configuration application interface 110 may include a control 206, such as a button or other UI component, to enable the user 104 to instruct the headless device 106 to connect to the wireless network corresponding to the selected network ID. The configuration application interface 110 may also include a control 208 to enable the user 104 to request that the wireless networking module 122 perform a rescan to detect available wireless networks in proximity to the headless device 106.

In some implementations, the list of detected wireless networks in the network availability information 124 may be automatically sorted (or may be sortable by the user 104) based on signal strength, SSID, or security of the network. In some cases, the network ID may be automatically selected as the SSID of the wireless network to which the user device 102 was last connected. In some cases, the list of wireless networks may be filtered to include those wireless networks having a signal strength above a predetermined threshold strength, or to include those networks that have a particular type of security enabled. Moreover, in some implementations the configuration application interface 110 may include a UI component such as a text box 210 that enables the user 104 to manually enter the network ID (e.g., the SSID) of the wireless network to be used by the headless device 106. The user 104 may employ such a component when the appropriate wireless network does not appear in the network availability information 124, because the signal strength of the network is low or because the network does not broadcast its SSID. The configuration application interface 110 may also include a UI component such as a text box 212 to enable the user 104 to enter a password for the wireless network corresponding to the designated network ID, in cases where the selected wireless network is secured.

Returning to FIG. 1, the configuration application 108 may send the token 118 and one or more network credentials 126 to a device registration module 128 executing on the headless device 106. The network credential(s) 126 may include the network ID (e.g., SSID) of the wireless network selected as described with reference to FIG. 2. In cases where the wireless network corresponding to the network credential(s) 126 is a secured wireless network, the network credential(s) 126 may include the wireless network password of the selected network. In some implementations, the device registration module 128 may include a web server executing on the headless device 106 (e.g., an embedded web server). In such cases, the token 118 and the network credential(s) 126 may be sent to the device registration module 128 using a HTTP or HTTPS request such as a POST or a PUT. In some cases, the message requesting the network availability information 124 and the response that includes the network availability information 124 may be received and sent respectively through the web server. In some implementations, the headless device 106 may execute a version of the Apache HTTP Server™ provided by the Apache Software Foundation™ Implementations also support the use of other types of web servers. In some cases, the web server may support a minimal set of features to reduce consumption of storage space or memory on the headless device 106. For example, the web server may support GET and POST requests through HTTP and HTTPS. The web server may also be configured to check for content type of the received data.

The headless device 106 may connect to the wireless network corresponding to the network credential(s) 126, and the headless device 106 may initiate a network connection with the configuration and registration service module 116 executing on the distributed computing device(s) 112. In some cases when the headless device 106 connects to the wireless network corresponding to the network credential(s) 126, the headless device 106 may discontinue the configuration mode, disable its wireless network access point 120, and terminate the previously established network connection with the user device 102. Alternatively, the headless device 106 may operate in a dual network mode and maintain its first network connection to the user device 102 while it initiates a second network connection to the distributed computing device(s) 112 over the wireless network indicated by the network credential(s) 126. In cases where the wireless network access point 120 is disabled, the user device 102 may reconnect to another network that it was previously using before it connected to the wireless network broadcast from the headless device 106, such as the network over which it received the token 118 from the distributed computing device(s) 112.

Over the network connection established with the distributed computing device(s) 112, the device registration module 128 may send a registration request 130 to the configuration and registration service module 116. The registration request 130 may include the token 118. On receiving the registration request 130, the configuration and registration service module 116 may validate the token 118. In some cases, the validation of the token 118 may include determining whether the token 118 is associated with a user 104 in the data structure (e.g., table) that associates user(s) 104 with token(s) 118. Validation of the token 118 may also include checking whether the token 118 is unexpired, or whether the token 118 is associated with a recent communication session between the configuration and registration service module 116 and the user 104 associated with the token 118.

If the configuration and registration service module 116 determines that the token 118 is valid and unexpired, the configuration and registration service module 116 may generate a registration key 132 that is then sent to the headless device 106 in response to the registration request 130. The headless device 106 may store the registration key 132 in local memory. The headless device 106 may employ the registration key 132 to authenticate the headless device 106 to service(s) executing on the distributed computing device(s) 112, during subsequent transactions or other communications. In some cases, the configuration and registration service module 116 may generate registration data 134 that associates the user 104 (e.g., the user 104 associated with the token 118) with the headless device 106. In some cases, the registration data 134 may also associate the registration key 132 with the device ID or device serial number of the headless device 106. Through use of the registration data 134, implementations enable the subsequent transactions requested from the headless device 106 to be associated with the user 104.

For example, to initiate a subsequent transaction a scanner of the headless device 106 may be employed to scan a barcode (or another machine-readable representation of data) on a product in the home of the user 104. Information identifying the product may then be sent from the headless device 106 to the distributed computing device(s) 112, along with the registration key 132. The registration key 132 may be employed by service(s) executing on the distributed computing device(s) 112 to authenticate the headless device 106 and determine the user 104 associated with the headless device 106 in the registration data 134. The scanned product may then be added to a shopping cart of the user 104 to enable the user 104 to purchase the product. Alternatively, the product to be added may be specified by the user 104 using a voice command received at the headless device 106. Through the use of the registration key 132 associated with the user 104 at the distributed computing device(s) 112, implementations enable transactions to be associated with the user 104 without necessitating the storage of user credentials (e.g., username and password) on the headless device 106 itself. The use of the registration key 132 to process transactions requested by the headless device 106 is described further with reference to FIG. 11.

Figure 3:
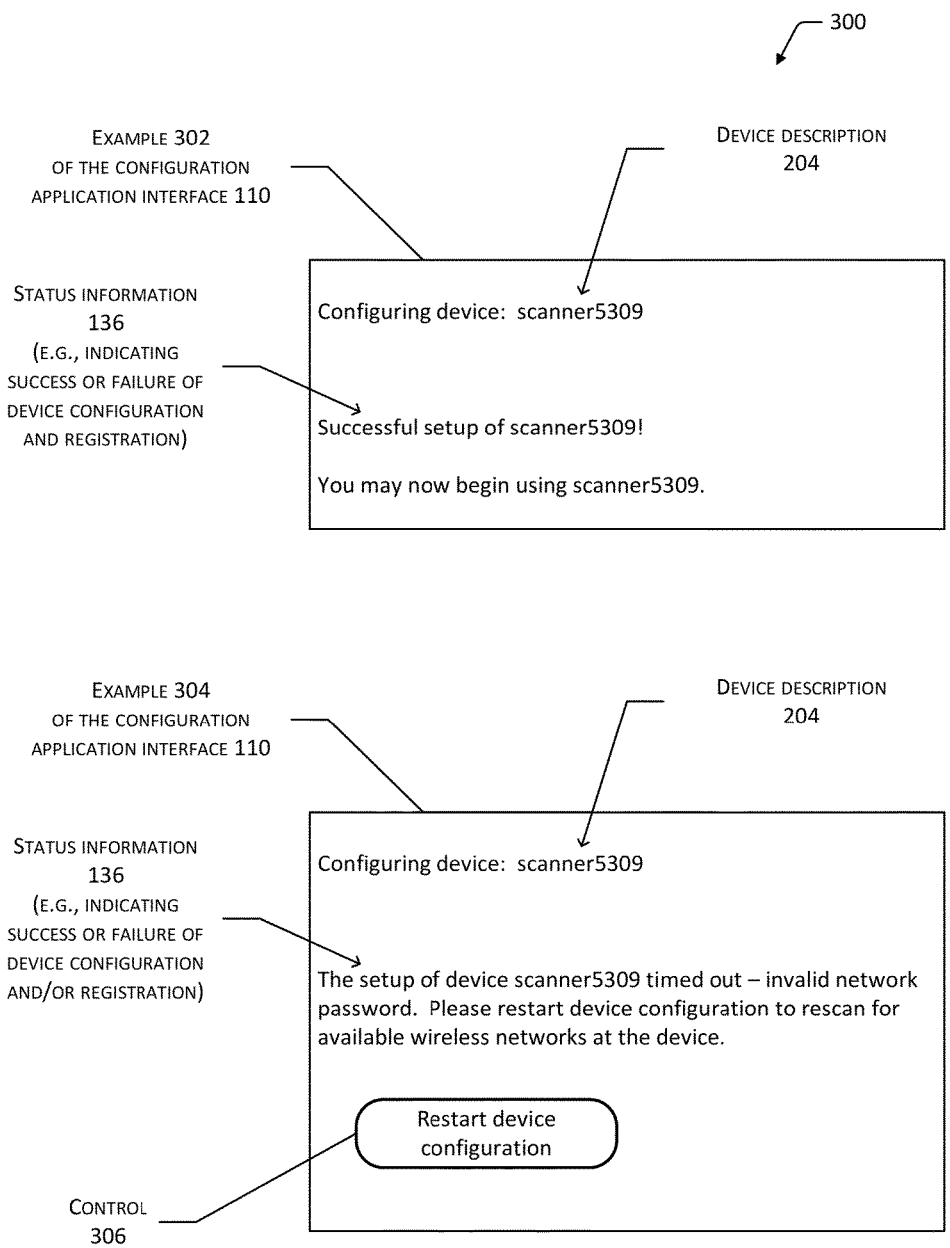
FIG. 3 depicts further examples of a user interface that may be presented on a user device for configuring a headless device.

In some implementations, the configuration and registration service module 116 may send status information 136 to the configuration application 108 executing on the user device 102. The status information 136 may indicate whether the registration of the headless device 106 succeeded or failed. FIG. 3 depicts a schematic 300 showing examples 302 and 304 of the configuration application interface 110 presenting the status information 136. In the example 302, the configuration application interface 110 is presenting the status information 136 indicating that the registration of the headless device 106 succeeded, and indicating that the headless device 106 may now be used to generate subsequent transactions. In the example 304, the configuration application interface 110 is presenting the status information 136 indicating that the registration of the headless device 106 failed. In such cases, status information 136 may include an indication of a reason why the registration failed, such as an invalid network password or the specified network was not reachable. In some implementations, the configuration application interface 110 may present a control 306 (e.g., a button) enabling the user 104 to request that the configuration and registration of the headless device 106 be restarted. In some cases, the attempted registration of the headless device 106 may be deemed a failure if a predetermined minimum period of time has elapsed since the token 118 was initially sent to the configuration application 108 from the configuration and registration service module 116.

Although the examples 202, 302, and 304 of FIGS. 2 and 3 depict the configuration application interface 110 as presenting particular controls and information in a particular arrangement in a UI window or view, implementations are not limited to this example. Any type of control may be employed to enable the user 104 to enter information and to issue commands to the configuration application interface 110, including but not limited to buttons, text boxes, radio buttons, slider controls, tree views, list views, pop-up dialogs, and so forth. Implementations also support the use of audio input methods or other types of inputs to the configuration application interface 110. The information presented through the configuration application interface 110 may be presented in any format or as any type of data, including visual output, audio output, or other types of output. The controls and other information may be presented in any time sequence, in any position, or in any arrangement, and may be distributed across any number of pages, windows, views, or dialogs.

Returning to FIG. 1, implementations enable the configuration of the headless device 106, including the designation of a wireless network to be employed by the headless device 106 to communicate with the distributed computing device(s) 112. Implementations also enable the registration of the headless device 106 with the configuration and registration service module 116 using the token 118. In some implementations, the data communicated between the user device 102 and the headless device 106 during the configuration of the headless device 106 may be formatted according to a version of the JavaScript Object Notation (JSON) standard. Moreover, in some implementations the data communicated between the headless device 106 and the distributed computing device(s) 112 during the registration of the headless device 106 may be formatted according to a version of the JSON standard. The configuration and registration of the headless device 106 is described further with reference to FIGS. 7-10.

To provide a UI for the configuration and registration of the headless device 106, implementations may provide the configuration application 108 as a web application or a native application. Because the configuration application 108 executes on the user device 102, and because the headless device 106 may not present a graphical UI for use during the configuration and registration process, implementations enable the UI to be changed without necessitating an update to the firmware of the headless device 106. Moreover, implementations also facilitate the localization of the UI to enable its use by users 104 who speak various languages or who are located in various geographical locations, given that such localization may be accomplished without necessitating a firmware update on the headless device 106.

As described above, during the configuration and registration process the user device 102 participates in various network connections with other devices. First, the user device 102 may establish a first network connection with the distributed computing device(s) 112 to login (e.g., authenticate the user 104), request the token 118 for registering the headless device 106, and receive the token 118. In some cases, the first network connection may be established using a network that is available in the home or office of the user 104, such as a local area network (LAN) that enables access to the Internet. Then, the user device 102 may establish a second network connection with the headless device 106 to request the network availability information 124 and to send the token 118 and the network credential(s) 126 to the headless device 106. This second network connection may employ the wireless network access point 120 that is incorporated into the headless device 106. In some cases, the second network connection may be a local peer-to-peer network between the user device 102 and the headless device 106. After the headless device 106 connects to the distributed computing device(s) 112 over the wireless network described by the network credential(s) 126, the user device 102 may then establish a third network connection (e.g., over a home or office LAN) with the distributed computing device(s) 112, or the user device 102 may reestablish or resume the first network connection. In some implementations, the operating system or other configuration aspects of the user device 102 may be such that the user 104 provides permission for the switching of communications from one network to another during the configuration and registration process.

Alternatively, the switching between at least some of these network connections may be substantially unperceivable by or transparent to the user 104. In some cases, from the point of view of the user 104, the user 104 may continue interacting with the same configuration application interface 110 throughout the configuration and registration process. For example, in implementations where the configuration application 108 is a web application, the user 104 may launch the configuration application 108 in a web browser by entering a particular Uniform Resource Identifier (URI) such as a Uniform Resource Name (URN) or Uniform Resource Locator (URL) (e.g., https://myscandevice.com). While the user device 102 is connected to the distributed computing device(s) 112 over the Internet, the URI may be resolved through a Domain Name System (DNS) to connect to the configuration and registration service module 116 executing on the distributed computing device(s) 112. Then, when the user device 102 disconnects from the Internet and connects to the wireless network access point 120 of the headless device 106, the same URI may resolve to a local address of the web server executing on the headless device 106 with the change in resolution being performed in a manner that is not readily perceivable by the user 104. In some cases, the change in the resolution of the URI may be accomplished through an entry added into a/etc/hosts file of the user device 102, or some other file that provides a mapping of URIs to Internet Protocol (IP) addresses. In this way, the data received from the headless device 106 may be presented through the configuration application interface 110 that is served from the configuration and registration service module 116. In some implementations, techniques for cross origin resource sharing (CORS) may be employed to switch the origin of the presented data from a first web server (e.g., executing on the distributed computing device(s) 112) to a second web server (e.g., executing on the headless device 106). This switching is described further with reference to FIG. 8.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to LANs, wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

Figure 4:
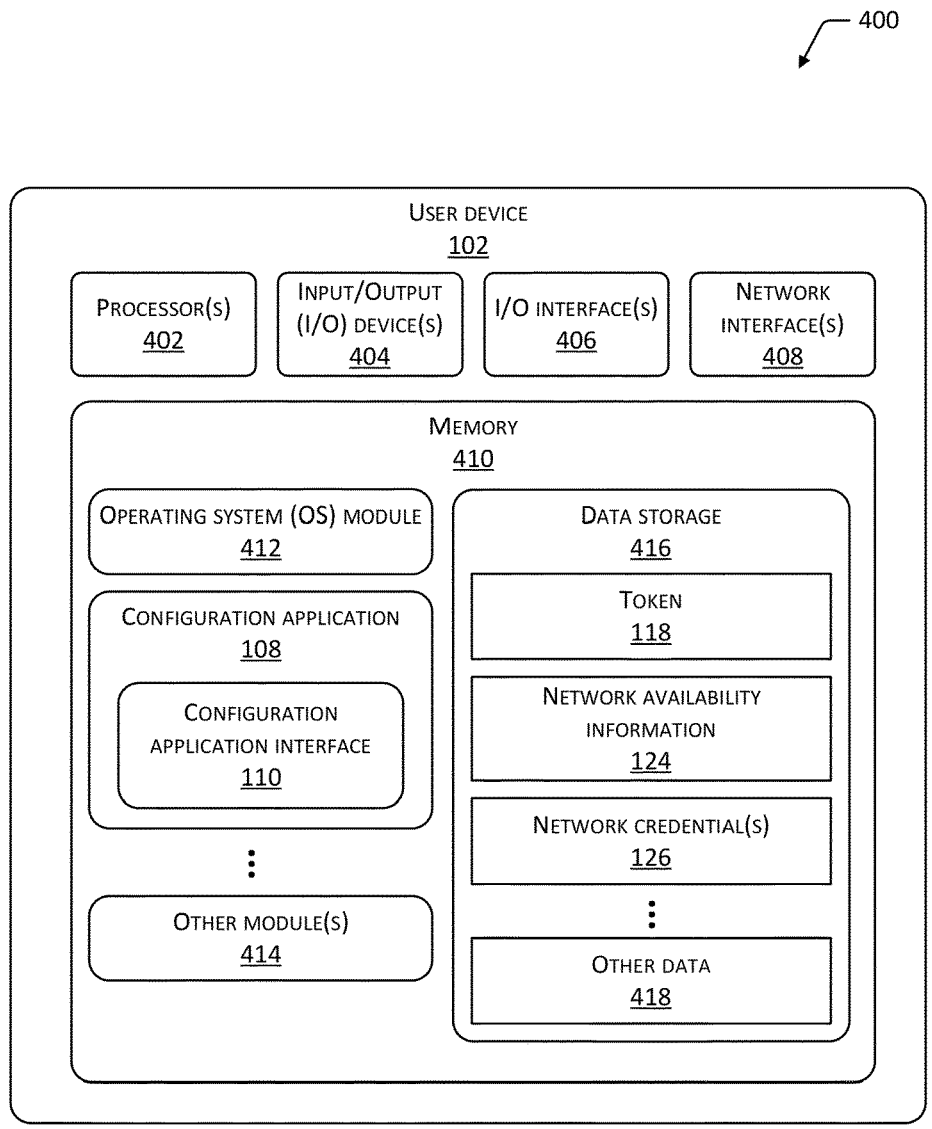
FIG. 4 depicts a block diagram of an example user device that may be employed by a user during the configuration and registration of a headless device.

FIG. 4 depicts a block diagram 400 of an example of the user device 102. As shown in the block diagram 400, the user device 102 may include one or more processors 402 (e.g., hardware-based processor(s)) configured to execute one or more stored instructions. The processor(s) 402 may comprise one or more cores.

The user device 102 may include one or more input/output (I/O) devices 404. The I/O device(s) 404 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 404 may also include output devices such as a display, an audio output device (e.g., a speaker), a printer, a haptic output device, and so forth. The I/O device(s) 404 may be physically incorporated with the user device 102 or may be externally placed.

The user device 102 may include one or more I/O interfaces 406 to enable components or modules of the user device 102 to control, interface with, or otherwise communicate with the I/O device(s) 404. The I/O interface(s) 406 may enable information to be transferred in or out of the user device 102 or between components of the user device 102, through serial communication, parallel communication, or other types of communication. For example, the I/O interface(s) 406 may comply with a version of the RS-232 standard for serial ports, or with a version of the IEEE 1284 standard for parallel ports. As another example, the I/O interface(s) 406 may be configured to provide a connection over Universal Serial Bus (USB) or Ethernet. In some cases, the I/O interface(s) 406 may be configured to provide a serial connection that is compliant with a version of the IEEE 1394 standard. The user device 102 may also include one or more busses or other internal communications hardware or software that allow for the transfer of data between the various modules and components of the user device 102.

The user device 102 may include one or more network interfaces 408 that enable communications between the user device 102 and other network accessible computing devices, such as the headless device 106 or the distributed computing device(s) 112. The network interface(s) 408 may include one or more network interface controllers (NICs) or other types of transceiver devices configured to send and receive communications over a network.

The user device 102 may include one or more memories, described herein as memory 410. The memory 410 comprises one or more computer-readable storage media (CRSM). The CRSM may include one or more of an electronic storage medium, a magnetic storage medium, an optical storage medium, a quantum storage medium, a mechanical computer storage medium, and so forth. The memory 410 provides storage of computer-readable instructions that may describe data structures, program modules, processes, applications, or other data for the operation of the user device 102. In some implementations, the memory 410 may provide storage of computer-readable instructions or other information in a non-transitory format.

The memory 410 may include an operating system (OS) module 412. The OS module 412 may be configured to manage hardware resources such as the I/O device(s) 404, the I/O interface(s) 406, and the network interface(s) 408, and to provide various services to applications, processes, or modules executing on the processor(s) 402. The OS module 412 may include one or more of the following: any version of the Linux™ operating system; any version of iOS™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The memory 410 may include one or more of the modules described above as executing on the user device 102, such as one or more of the configuration application 108 or the configuration application interface 110. The memory 410 may also include one or more other modules 414, such as a user authentication module or an access control module to secure access to the user device 102, and so forth.

The memory 410 may include data storage 416 to store data for operations of the user device 102. The data storage 416 may comprise a database, array, structured list, tree, or other data structure, and may be a relational or a non-relational datastore. The data storage 416 may store data such as that described above, including one or more of the token 118, the network availability information 124, or the network credential(s) 126. The data storage 416 may also store other data 418, such as user authentication information or access control data. In some implementations, at least a portion of the information stored in the data storage 416 may be stored externally to the user device 102, on other devices that may communicate with the user device 102 via the I/O interface(s) 406 or via the network interface(s) 408.

Figure 5:
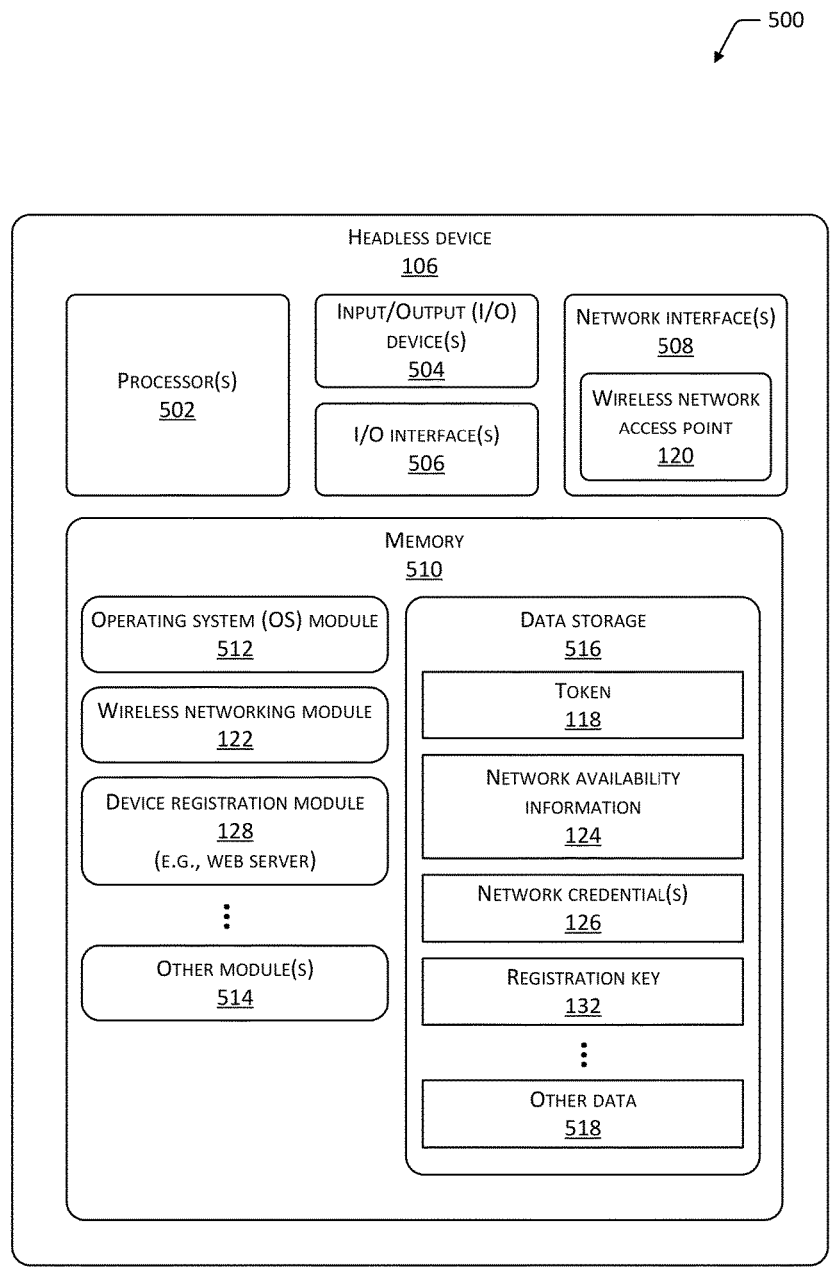
FIG. 5 depicts a block diagram of an example headless device that may be configured and registered.

FIG. 5 depicts a block diagram 500 of an example of the headless device 106. As shown in the block diagram 500, the headless device 106 may include one or more processors 502 (e.g., hardware-based processor(s)) configured to execute one or more stored instructions. The processor(s) 502 may comprise one or more cores. The headless device 106 may include one or more I/O devices 504, one or more I/O interfaces 506, and one or more network interfaces 508 as described above respectively with reference to the I/O device(s) 404, the I/O interface(s) 406, and the network interface(s) 408. In some implementations, the I/O device(s) 504 of the headless device 106 may not include a display or may include a display with limited capabilities as described above. In some implementations, the network interface(s) 508 may be configured to act as the wireless network access point 120 that broadcasts a wireless network employable by the user device 102 to communicate with the headless device 106.

The headless device 106 may include one or more memories, described herein as memory 510. The memory 510 comprises one or more CRSM, as described above with reference to the memory 410. The memory 510 may include an OS module 512 that is configured to manage hardware resources such as the I/O device(s) 504, the I/O interface(s) 506, and the network interface(s) 508, and to provide various services to applications, processes, or modules executing on the processor(s) 502. The OS module 512 may include one or more of the operating systems described above with reference to the OS module 412. The memory 510 may include one or more of the modules described above as executing on the headless device 106, such as the wireless networking module 122 and the device registration module 128. The memory 510 may also include one or more other modules 514, such as a user authentication module or an access control module to secure access to the headless device 106, and so forth.

The memory 510 may include the data storage 516, which may store data for operations of the headless device 106. The data storage 516 may comprise a database, array, structured list, tree, or other data structure, and may be a relational or a non-relational datastore. The data storage 516 may store data such as that described above as present on the headless device 106, including one or more of the token 118, the network availability information 124, the network credential(s) 126, or the registration key 132. In some implementations, the token 118 and the registration key 132 may occupy substantially the same space or location in the data storage 516. In such cases, the data stored in that location may include a flag or other indication whether the stored data is the token 118 or the registration key 132. The data storage 516 may also store other data 518, such as user authentication information or access control data. In some implementations, at least a portion of the information stored in the data storage 516 may be stored externally to the headless device 106, on other devices that may communicate with the headless device 106 via the I/O interface(s) 506 or via the network interface(s) 508.

Figure 6:
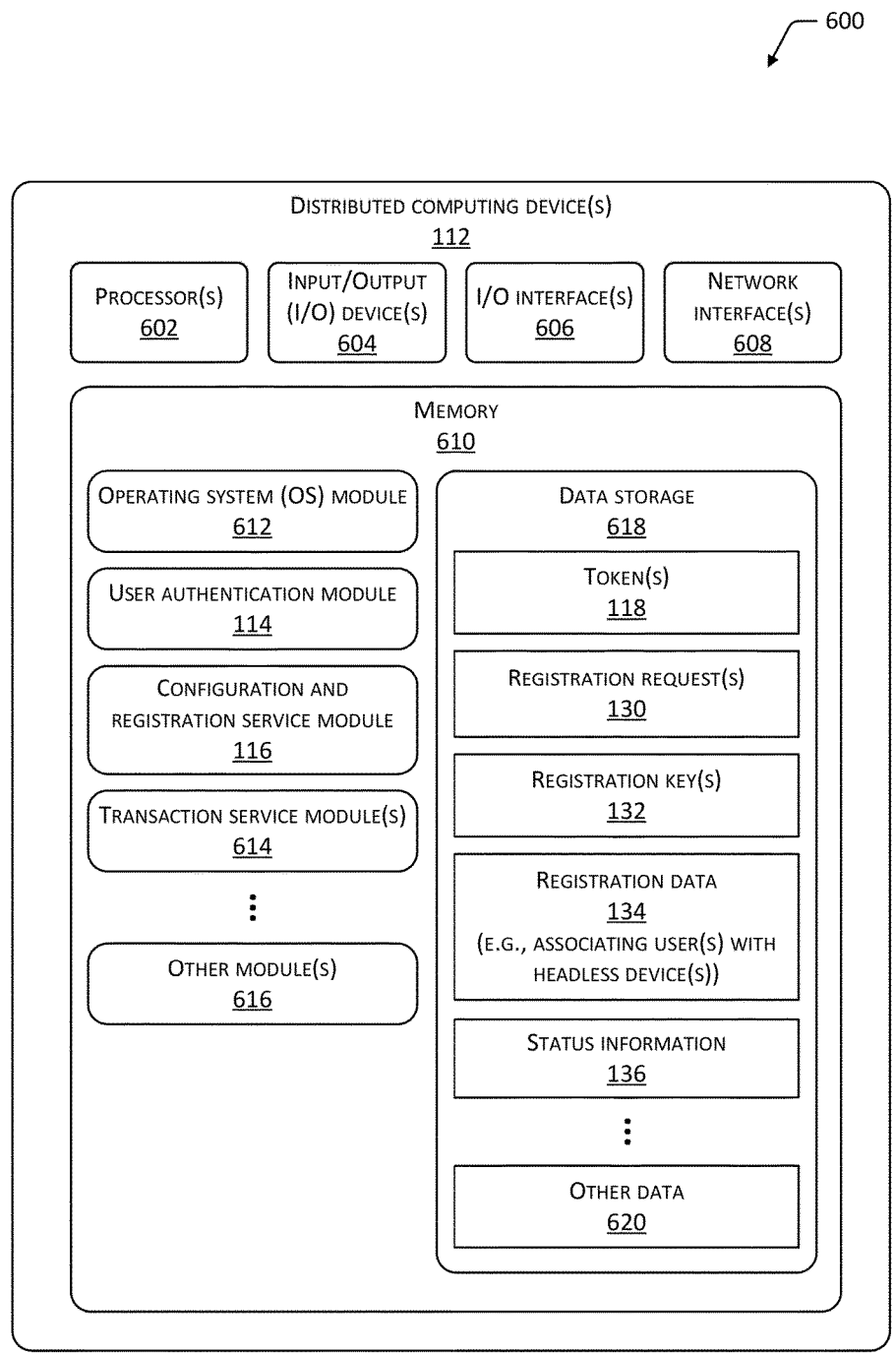
FIG. 6 depicts a block diagram of example distributed computing devices configured to perform operations for the registration of a headless device.

FIG. 6 depicts a block diagram 600 of an example of the distributed computing device(s) 112. As shown in the block diagram 600, the distributed computing device(s) 112 may include one or more processors 602 (e.g., hardware-based processor(s)) configured to execute one or more stored instructions. The processor(s) 602 may comprise one or more cores. The distributed computing device(s) 112 may include one or more I/O devices 604, one or more I/O interfaces 606, and one or more network interfaces 608 as described above respectively with reference to the I/O device(s) 404, the I/O interface(s) 406, and the network interface(s) 408.

The distributed computing device(s) 112 may include one or more memories, described herein as memory 610. The memory 610 comprises one or more CRSM, as described above with reference to the memory 410. The memory 610 may include an OS module 612 that is configured to manage hardware resources such as the I/O device(s) 604, the I/O interface(s) 606, and the network interface(s) 608, and to provide various services to applications, processes, or modules executing on the processor(s) 602. The OS module 612 may include one or more of the operating systems described above with reference to the OS module 412. The memory 610 may include one or more of the modules described above as executing on the distributed computing device(s) 112, such as the user authentication module 114 and the configuration and registration service module 116. In some cases, the memory 610 may include one or more transaction service modules 614. The transaction service module(s) 614 may receive and process transactions that are initiated by the headless device 106 and that include the registration key 132 to authenticate the headless device 106. The memory 610 may also include one or more other modules 616, such as a user authentication module or an access control module to secure access to the distributed computing device(s) 112, and so forth. The other module(s) 616 may also include one or more modules for logging or auditing information associated with the configuration and registration of the headless device(s) 106, or one or more modules for analysis of the information (e.g., to generate statistics and so forth).

The memory 610 may include the data storage 618, which may store data for operations of the distributed computing device(s) 112. The data storage 618 may comprise a database, array, structured list, tree, or other data structure, and may be a relational or a non-relational datastore. The data storage 618 may store data such as that described above as present on the distributed computing device(s) 112, including one or more tokens 118, one or more registration requests 130, one or more registration keys 132, the registration data 134, or the status information 136. The data storage 618 may also store other data 620, such as user authentication information or access control data. In some implementations, at least a portion of the information stored in the data storage 618 may be stored externally to the distributed computing device(s) 112, on other devices that may communicate with the distributed computing device(s) 112 via the I/O interface(s) 606 or via the network interface(s) 608.

Figure 7:
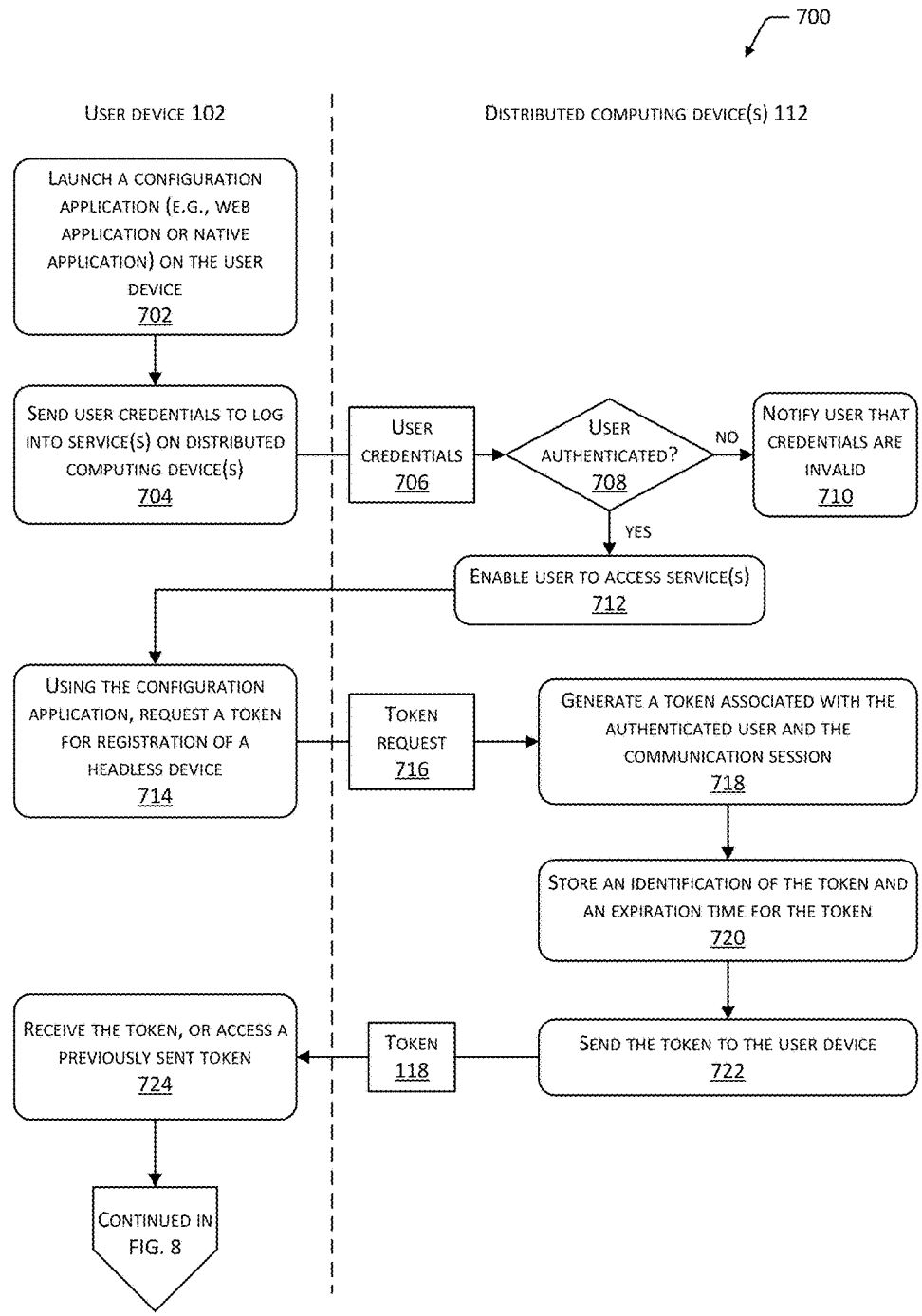
FIG. 7 depicts a flow diagram of a process for generating a token to be employed during the registration of a headless device, the token associated with an authenticated user.

FIG. 7 depicts a flow diagram 700 of a process for providing the token 118 to be employed during the registration of the headless device 106. Operations of the process may be performed by the configuration application 108, the configuration application interface 110, other modules executing on the user device 102, the user authentication module 114, the configuration and registration service module 116, other modules executing on the distributed computing device(s) 112, or other modules executing on other devices.

At 702, the user 104 may launch the configuration application 108 on the user device 102 or the configuration application 108 may otherwise begin executing on the user device 102. In cases where the configuration application 108 is a native application, the configuration application 108 may attempt to establish a connection with the configuration and registration service module 116 after it begins executing. In cases where the configuration application 108 is a web application, the configuration application 108 may comprise one or more web pages served from the configuration and registration service module 116 running within a web server, application server, or other content server executing on the distributed computing device(s) 112.

At 704, the user 104 may send user credentials 706 to log into or otherwise request access to the configuration and registration service module 116 or to other services provided by the distributed computing device(s) 112. The user credentials 706 may include a username, password, passcode, certificate, challenge question response, or other security credentials.

At 708, a determination may be made whether the user 104 is to be authenticated based on the user credentials 706. If the user credentials 706 are deemed to be invalid or insufficient, the process may proceed to 710 and the user 104 may be notified that the user credentials 706 are invalid or insufficient. Such notification may be performed through information presented in the UI of the configuration application 108. If the user credentials 706 are deemed to be valid and sufficient, the process may proceed to 712 and enable the user 104 to access service(s) on the distributed computing device(s) 112.

At 714, using the configuration application 108 the user 104 may send a token request 716 to request the token 118 to be employed during the registration of the headless device 106.

On receiving the token request 716 the configuration and registration service module 116 may, at 718, generate the token 118 that is associated with the authenticated user 104. In some cases, the token 118 may be valid for a predetermined period of time following its generation or following its communication to the user device 102. In such cases, the token 118 may not be accepted to register a headless device 106 if the token 118 is presented by the headless device 106 after its expiration. In some implementations, the token 118 may be associated with a particular communication session established between the user device 102 and the distributed computing device(s) 112 for the authenticated user 104. In such cases, the token 118 may not be accepted if it is presented to register a headless device 106 outside the associated communication session.

At 720, an identification of the token 118 may be stored in a data structure on the distributed computing device(s) 112. The data structure may identify the token 118, the user 104 that requested the token 118, and the expiration time of the token 118. In cases where the token 118 is to be used during the same communication session, the data structure may also identify the communication session using a HTTP session ID, HTTPS session ID, or other identifier.

At 722, the token 118 may be sent to the configuration application 108 executing on the user device 102. At 724, the user device 102 may receive the token 118. In some cases, the token 118 may be stored in memory on the user device 102 and accessed subsequently to register a headless device 106. In such cases, a previously sent token 118 may be accessed at 724. The process may continue as described with reference to FIG. 8.

Figure 8:
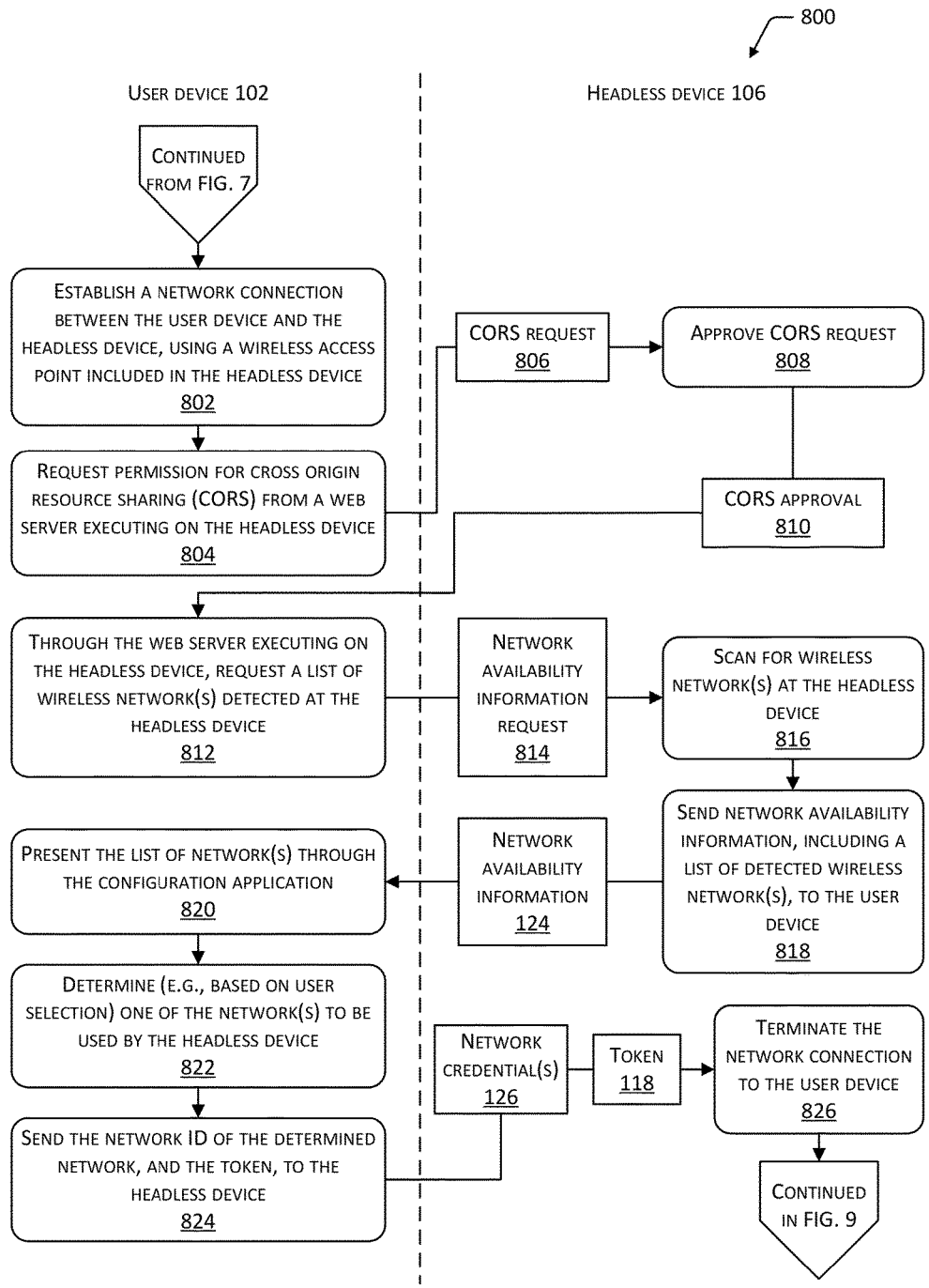
FIG. 8 depicts a flow diagram of a process for determining a wireless network to be employed by a headless device, and for providing the token to the headless device from the user device.

FIG. 8 depicts a flow diagram 800 of a process for configuring the headless device 106, including determining a wireless network to be employed by the headless device 106 and providing the token 118 to the headless device 106 from the user device 102. Operations of the process may be performed by the configuration application 108, the configuration application interface 110, other modules executing on the user device 102, the wireless networking module 122, the device registration module 128, other modules executing on the headless device 106, or other modules executing on other devices.

At 802, a network connection may be established between the user device 102 and the headless device 106 using the wireless network access point 120 included in the headless device 106. As described above, in some cases the transition of the user device 102 from using the previous network connection (e.g., used to communicate with the distributed computing device(s) 112) to using the network connection with the wireless network access point 120 may be substantially unperceivable by or transparent to the user 104. Alternatively, the user 104 may manually instruct a network interface 408 of the user device 102 to connect to the different network.

At 804, in implementations where the configuration application 108 is a web application, a CORS request 806 may be sent to the web server executing on the headless device 106. The CORS request 806 may request permission for the sharing of resources across different origins. CORS enables JavaScript™ code executing within a web page to request information supplied from a different origin (e.g., domain) such as a different web server or a different web service other than the domain that initially served the JavaScript™ code. The CORS request 806 may be a HTTP request that includes an Origin HTTP header specifying the domain that originated (e.g., initially served) the JavaScript™ code. For example, the Origin HTTP header may specify an address of the domain corresponding to the configuration and registration service module 116 executing on the distributed computing device(s) 112.

At 808, the web server executing on the headless device 106 may approve the CORS request 806 and send a CORS approval 810 to the configuration application 108 executing on the user device 102. The CORS approval 810 may be a HTTP response that includes an Access-Control-Allow-Origin header. The value in the header may specify that cross origin requests are to be permitted from the origin domain specified in the CORS request 806. In implementations where the configuration application 108 is a native application, the operations of 804 and 808 may be omitted.

At 812, the configuration application 108 may send a network availability information request 814 requesting the network availability information 124. In some implementations, the network availability information request 814 may be sent as a HTTP request to a web server executing on the headless device 106.

At 816, the wireless networking module 122 or another module may scan for wireless networks with a signal strength such that they are detected at the headless device 106.

At 818, the network availability information 124 may be sent to the user device 102. The network availability information 124 may include a list of the wireless network(s) that were detected during the scan. In some cases, the scan may have been performed previously and the network availability information 124 may have been stored in memory on the headless device 106. In such cases, the previously generated network availability information 124 may be retrieved from memory and sent to the user device 102 in response to the network availability information request 814.

At 820, the network availability information 124 may be presented to the user 104 through the configuration application interface 110, as described above with reference to FIG. 2.

At 822, one of the available wireless network(s) may be determined and designated to be employed by the headless device 106 in subsequent communications. In some cases, the wireless network to be used may be selected by the user 104 through the configuration application interface 110. In some cases, the wireless network most recently employed by the user device 102 may be automatically selected as the wireless network to be employed by the headless device 106.

At 824, the token 118 and the network credential(s) 126 (e.g., SSID) of the selected wireless network may be sent to the headless device 106. In cases where the selected wireless network is secured, a password may also be specified by the user 104 and sent to the headless device 106 in the network credential(s) 126.

At 826, in some cases the headless device 106 may terminate its network connection to the user device 102 by disabling the wireless network access point 120. Alternatively, the headless device 106 may retain its connection to the user device 102 while it connects to the distributed computing device(s) 126 over the wireless network indicated by the network credential(s) 126, if the hardware and software configuration of the headless device 106 permits dual mode networking operations (e.g., simultaneous connections to two networks). The process may continue as described with reference to FIG. 9.

Figure 9:
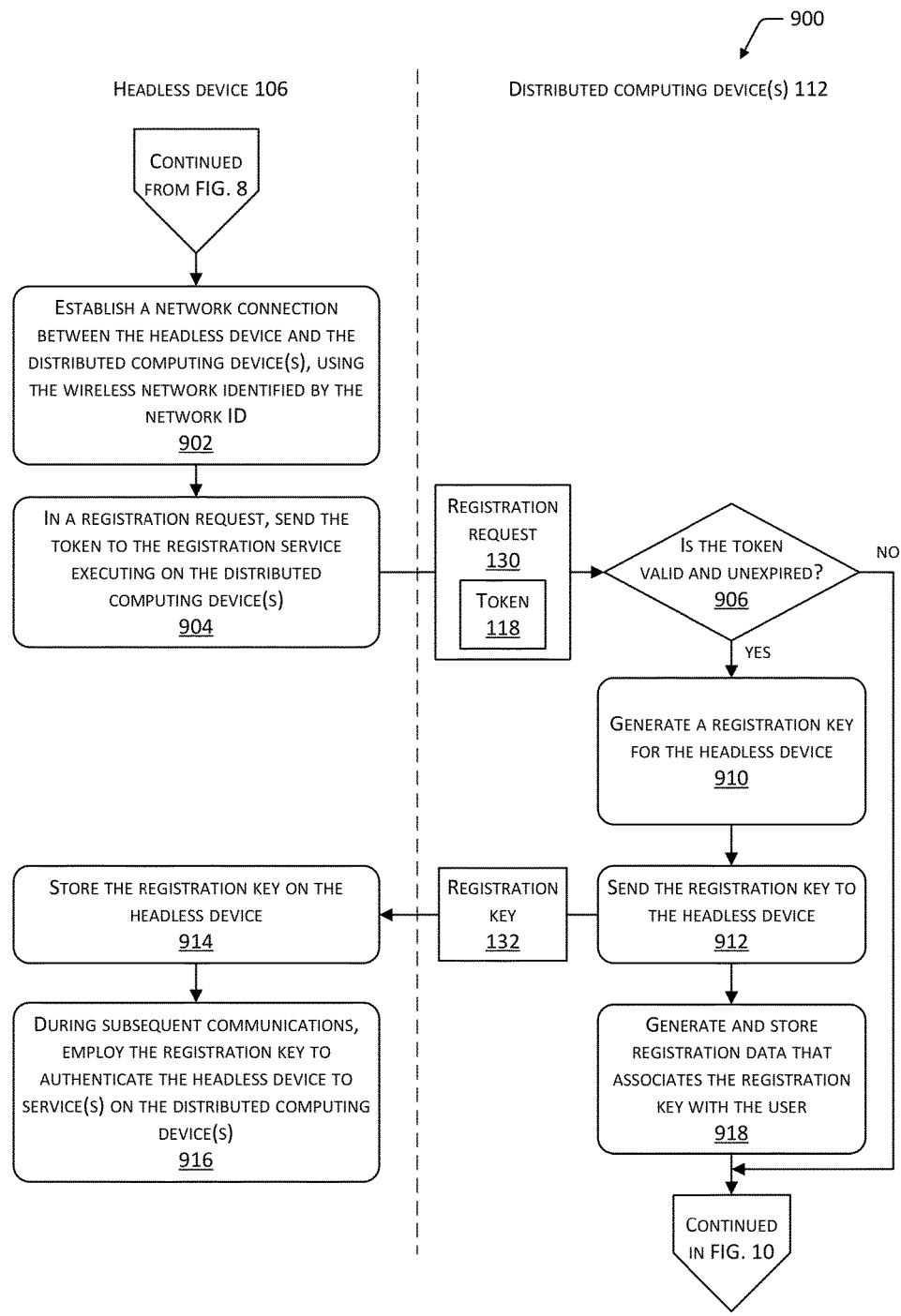
FIG. 9 depicts a flow diagram of a process for employing the token to register the headless device with a registration service executing on one or more distributed computing devices.

FIG. 9 depicts a flow diagram 900 of a process for employing the token 118 to register the headless device 106 with the configuration and registration service module 116 executing on the distributed computing device(s) 112. Operations of the process may be performed by the device registration module 128, other modules executing on the headless device 106, the configuration and registration service module 116, other modules executing on the distributed computing device(s) 112, or other modules executing on other devices.

At 902, a network connection is established between the headless device 106 and the configuration and registration service module 116 executing on the distributed computing device(s) 112. The network connection established at 902 may use the wireless network identified by the network credential(s) 126.

At 904, the registration request 130 is sent to the configuration and registration service module 116 from the headless device 106. The registration request 130 may include the token 118. In some implementations, the registration request 130 may also include a device serial number, media access control (MAC) address, or other device ID that uniquely identifies the headless device 106.

At 906, the configuration and registration service module 116 may examine the token 118 and determine whether it is valid and unexpired. In some cases, the validation of the token 118 may include determining whether the token 118 is associated with a user 104. Validation may also include determining whether the current time is before the expiration time of the token 118. In some implementations, the token 118 may be associated with a particular communication session involving the user device 102 and associated with the user 104 who was authenticated at 708. In such cases, validation of the token 118 may include checking whether the communication session with the user device 102 is still active. If the token 118 is determined at 906 to be invalid or expired, the process may continue as described with reference to FIG. 10. If the token 118 is determined at 906 to be valid and not expired, the process may continue to 910.

At 910, the registration key 132 may be generated. In some cases, the registration key 132 may be generated to be unique with respect to the particular headless device 106 that sent the registration request 130. At 912, the registration key may be sent to the headless device 106. The process on the distributed computing device(s) 112 may then continue to 918. The registration key 132 may be generated through a random or pseudo-random process, such that no information regarding the headless device 106 is included in the registration key 132, and such that the identity of the headless device 106 or the user 104 may not be derived by an entity that gains unauthorized access to the registration key 132. The registration key 132 may be employed as a shared secret in communications between the headless device 106 and the distributed computing device(s) 112, for hash message authentication code (HMAC) Advanced Encryption Standard (AES), or other cryptographic techniques that secure such communications or authenticate the headless device 106.

At 914, the registration key 132 may be stored on the headless device 106. In some implementations, the registration key 132 may be stored in a secure area of the data storage 516 on the headless device 106, to prevent unauthorized access to the registration key 132 and to prevent cloning of the headless device 106 using the registration key 132. In some implementations, the registration key 132 may be stored in the flash memory that is part of the processor(s) 502 of the headless device 106, and a bit may be sent to prevent the reading of the flash memory by external processes. In some cases, the registration key 132 may be stored in an encrypted format on the headless device 106.

At 916, during subsequent communications with service(s) executing on the distributed computing device(s) 112, the headless device 106 may employ the registration key 132 to authenticate the headless device 106 to such service(s). An example of such authentication is described with reference to FIG. 11.

At 918, the configuration and registration service module 116 on the distributed computing device(s) 112 may generate and store registration data 134 that associates the registration key 132 with the user 104, with the headless device 106, or with both the user 104 and the headless device 106. For example, the registration data 134 may provide a mapping between the registration key 132 and the user name or other identifier of the user 104. The registration data 134 may also provide a mapping between the registration key and the device ID for the headless device 106. Such registration data 134 may be employed to authenticate the headless device 106 during subsequent communications from the headless device 106, and to decrypt information sent by the headless device 106 during the subsequent transactions. The registration data 134 may also be employed to determine the user 104 who is associated with the headless device 106 during such communications. The process may continue as described with reference to FIG. 10.

Figure 10:
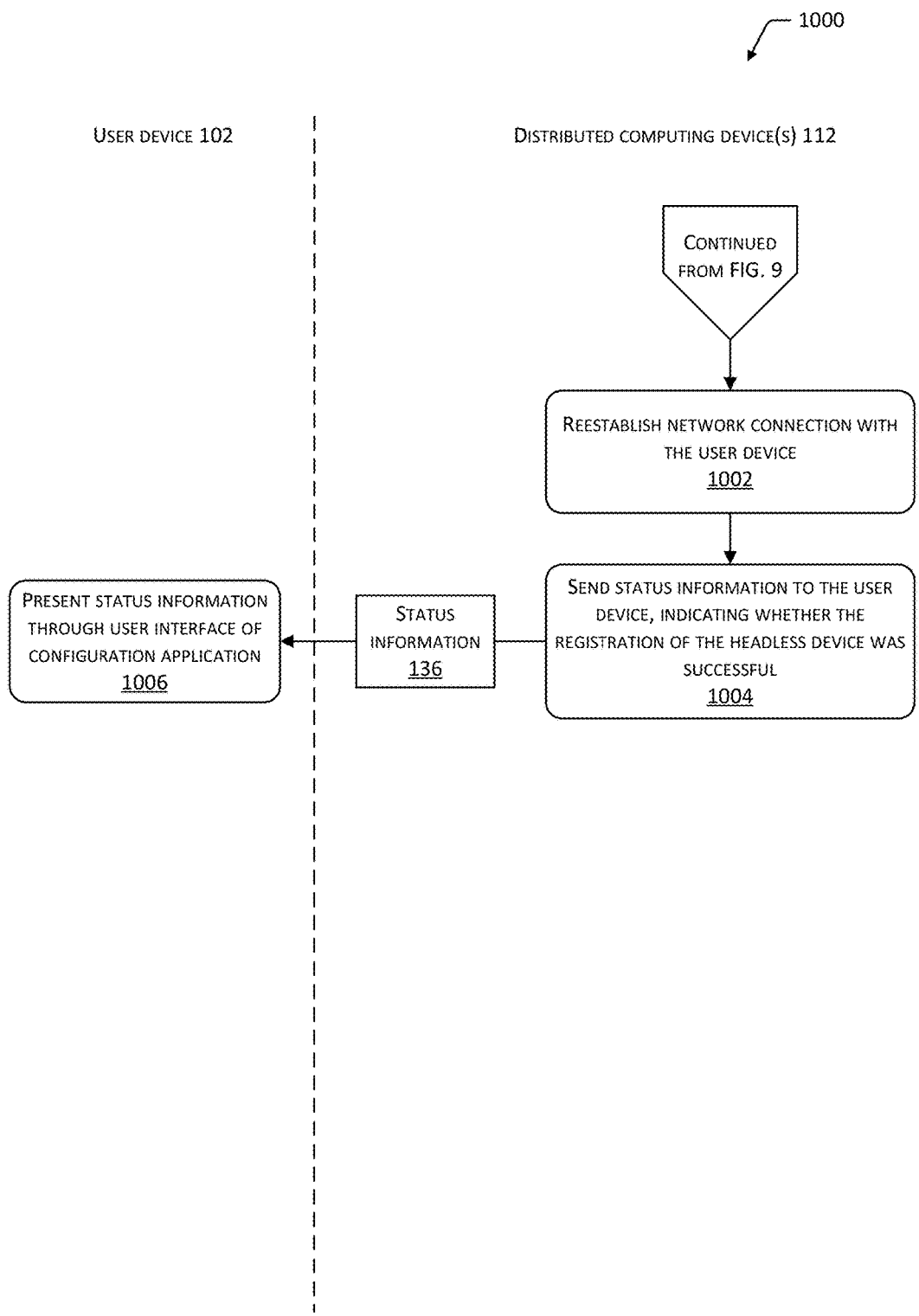
FIG. 10 depicts a flow diagram of a process for sending a status notification to the user device to indicate a result of the attempted registration of the headless device.

FIG. 10 depicts a flow diagram 1000 of a process for providing the status information 136 to the user device 102 to indicate a result of the attempted registration of the headless device 106. Operations of the process may be performed by the configuration application 108, the configuration application interface 110, other modules executing on the user device 102, the configuration and registration service module 116, other modules executing on the distributed computing device(s) 112, or other modules executing on other devices.

At 1002, a network connection may be reestablished between the configuration application 108 executing on the user device 102 and the configuration and registration service module 116 executing on the distributed computing device(s) 112.

At 1004, the status information 136 may be sent to the user device 102, the status information 136 indicating whether the registration of the headless device 106 was successful.

At 1006, the status information 136 may be presented through the configuration application interface 110 as described with reference to FIG. 3.

Figure 11:
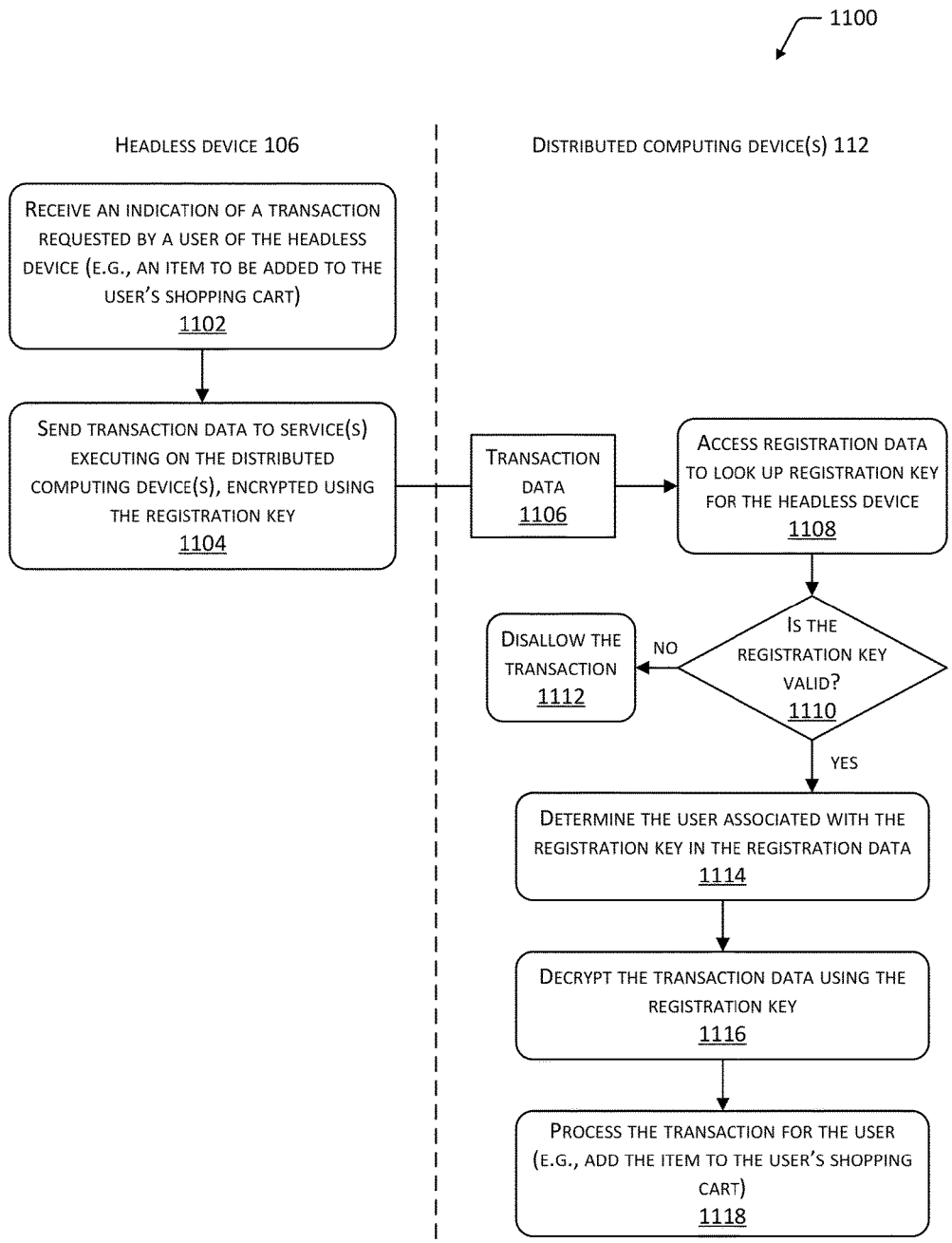
FIG. 11 depicts a flow diagram of a process for using a registration key to authenticate the headless device to services executing on one or more distributed computing devices, the authentication performed to process a transaction initiated from the headless device.

FIG. 11 depicts a flow diagram 1100 of a process for using the registration key 132 to authenticate the headless device 106 to the distributed computing device(s) 112 during a transaction initiated from the headless device 106. Operations of the process may be performed by the device registration module 128, other modules executing on the headless device 106, the configuration and registration service module 116, the transaction service module(s) 614, other modules executing on the distributed computing device(s) 112, or other modules executing on other devices.

At 1102, the headless device 106 may receive an indication of a transaction requested by the user 104. For example, the user 104 may employ the scanner of the headless device 106 to scan the barcode of a product, indicating that the product is to be added to the user's shopping cart. Alternatively, the user 104 may employ the speech recognition capabilities of the headless device 106 to indicate a product to be added to the shopping cart, by speaking a name or description of the product in the vicinity of the headless device 106. In some cases, one or more buttons may be included on the headless device 106 and the user may press the one or more buttons to indicate that the headless device 106 is to scan a barcode or accept a voice input.

At 1104, transaction data 1106 may be sent to service(s) executing on the distributed computing device(s) 112. The transaction data 1106 may be encrypted using the registration key 132 that was previously provided to the headless device 106 during the registration process described with reference to FIG. 9. In some implementations, the transaction data 1106 may be encrypted using HMAC, based on the registration key 132.

At 1108, the service(s) that received the transaction data 1106 may access the registration data 134 to look up the registration key 132 corresponding to the device ID or device serial number of the headless device 106 that sent the transaction data 1106. At 1110, a determination may be made whether the registration key 132 is valid. In some cases, a registration key 132 may be determined to be valid if it maps to a user 104 in the registration data 134. If the registration key 132 is determined to be invalid, the process may proceed to 1112 and disallow the transaction described in the transaction data 1106. If the registration key 132 is determined at 1110 to be valid, the process may proceed to 1114.

At 1114, a determination is made of the user 104 who is associated with the registration key 132 in the registration data 134. At 1116, the transaction data 1106 may be decrypted using the registration key 132 retrieved from the registration data 134. At 1118, the transaction is processed for the user 104. For example, the requested product may be added to a shopping cart associated with the user 104. In some implementations the user 104 may also be sent a notification, via email, text message, or other means, indicating that the transaction has been processed (e.g., that the requested item has been added to the user's shopping cart).

Figure 12:
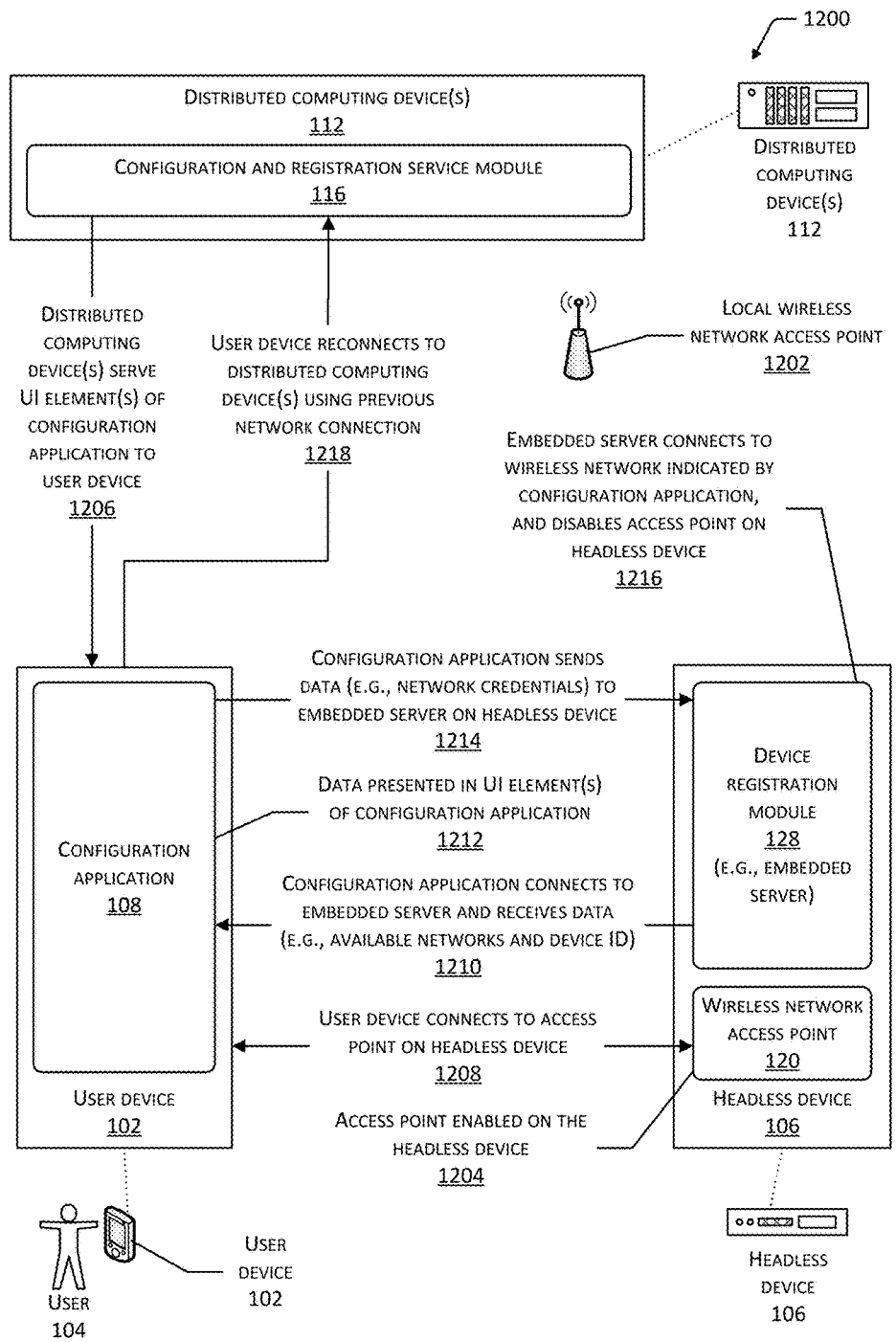
FIG. 12 depicts an environment including a user device that is employable by a user to configure the headless device through a configuration application served from one or more distributed computing devices.

Although the above examples may describe configuring the headless device 106 for token-based registration, implementations are not so limited. FIG. 12 depicts an environment 1200 in which the user device 102 may be employed to configure the headless device 106, based on a UI (e.g., the configuration application 108) or other user experience that is provided by the distributed computing device(s) 112.

In some implementations, the environment 1200 may include a local wireless network access point 1202. The local wireless network access point 1202 may be configured to broadcast and receive signals according to any version of the IEEE 802.11 standard for wireless networks, or according to another wireless networking protocols. In some cases, the local wireless network access point 1202 may provide a WLAN that enables devices such as the user device 102 or the headless device 106 to access the Internet or some other WAN.

At 1204, the wireless network access point 120 may be enabled on the headless device 106, such that other devices may connect to the wireless network broadcast by the wireless network access point 120. In some cases, the wireless network access point 120 may be automatically enabled when the user 104 turns on or powers the headless device 106. In some cases, the wireless network access point 120 may be enabled in response to a command or action from the user 104. For example, the wireless network access point 120 may be enabled when the user 104 presses one or more buttons on the headless device 106, shakes the headless device 106, or otherwise manipulates the headless device 106 in a manner that the headless device 106 may recognize as a command to enable the wireless network access point 120. As another example, the wireless network access point 120 may be enabled in response to a voice command uttered by the user 104, the voice command instructing the headless device 106 to enable the wireless network access point 120.

At 1206, the configuration and registration service module 116, or another service provided by the distributed computing device(s) 112, may serve at least a portion of the configuration application 108 to the user device 102. In some cases, one or more UI elements of the configuration application 108 may be communicated to the user device 102. In some implementations, at least a portion of the configuration application 108 may be served to the user device 102 after the user 104 has provided user credentials (e.g., user name and password) and has been authenticated to the configuration and registration service module 116. In some implementations, the configuration application 108 may be a web application that is written to be presented in a web browser executing on the user device 102. In such cases, the configuration application 108 may be served in response to the user 104 navigating to a URL in the web browser. In some cases, at least a portion of the configuration application 108 may be communicated from the distributed computing device(s) 112 to the user device 102 over a network provided at least partly by the local wireless network access point 1202. Alternatively, at least a portion of the configuration application 108 may be communicated to the user device 102 over a wired LAN.

In some implementations, the communicated portion of the configuration application 108 may include one or more UI elements of the configuration application 108 and a description of their arrangement within the configuration application interface 110. The configuration application 108 may include any number of UI elements that are arranged to provide the configuration application interface 110. The UI element(s) and the arrangement of the UI elements may be described in a markup language such as HTML, XHTML, DHTML, and so forth. The communicated portion of the configuration application 108 may include a suggested arrangement for rendering the UI element(s) on the user device 102, and a web browser or the configuration application 108 may take the suggestion into account when presenting the UI element(s).

The configuration application 108 may include substantially static elements (e.g., written in HTML5 or any other language), substantially dynamic elements (e.g., written in JavaScript™ or any other language), or both static and dynamic elements. The configuration application 108 may include dynamic elements that perform client-side processing of data, such as script or program elements that execute on the user device 102. The configuration application 108 may also include dynamic elements that perform server-side processing of data, such as script or program elements that execute on the distributed computing device(s) 112 to determine the information that is sent to the user device 102 in the configuration application 108. In some cases, static elements may be rendered substantially similarly in various presentations of the configuration application 108. Dynamic elements may vary from presentation to presentation based on the state or configuration of the user device 102 or the distributed computing device(s) 112, based on characteristics of the user 104, based on information input by the user 104, or based on other information. In some implementations, the configuration application 108 may be designed and written to communicate with the device registration module 128 on the headless device 106 using a communication format supported by the device registration module 128. For example, the configuration application 108 may be configured to communicate with the device registration module 128 according to a version of the JSON standard. In some implementations, the configuration application 108 may be written to include an address (e.g., a URL) of the device registration module 128 with which it will be communicating.

The configuration application 108 may include any number of web pages that each include any number of elements such as UI elements. The element(s) may include, but are not limited to, one or more of the following:

Substantially static elements including data and metadata described using any version of HTML, DHTML, XHTML, XML, or other types of character data encoded using American Standard Code for Information Exchange (ASCII), Unicode, or any other format;

Script or program elements that provide dynamic content using any scripting language or other type of programming language, including any version of JavaScript™, VBScript™, Perl™, Common Gateway Interface (CGI), Cascading Style Sheets (CSS), other types of style sheets, and so forth;

Image files such as a version of the Joint Photographic Experts Group (JPEG) format, the Graphics Interchange Format (GIF), the Bitmap (BMP) image file format, and so forth;

Audio, video, or multimedia content files, such as a version of the Waveform Audio File Format (WAV), the AU file format, the Moving Picture Experts Group (MPEG) formats such as MPEG-1, MPEG-2, MP3, or MPEG-4 formats, the Audio Video Interleave (AVI) format, and so forth; or User interface components or controls, including but not limited to menus, menu items, input boxes, buttons, radio buttons, checkboxes, drop down lists, tabs, tree controls, zoom controls, selectable icons, and so forth.

As described above, the configuration application 108 may be a native application executing on the user device 102. Alternatively, the configuration application 108 may be a web application that is presented, at least in part, within a web browser executing on the user device 102. The configuration application 108 may comprise one or more web pages that include any combination of static and dynamic content. In some cases, the configuration application 108 may be a native application that includes one or more objects or classes (e.g., a WebView or UIWebView object) that operate to present web content within the configuration application 108.

At 1208, the user device 102 may connect to the wireless network access point 120 broadcasting from the headless device 106. In some cases, the configuration application 108 may be written to include the SSID of the wireless network broadcast from the wireless network access point 120, enabling the configuration application 108 to automatically connect to the wireless network. Alternatively, the user 104 may be prompted to manually switch the network interface 408 to connect to the wireless network.

The configuration application 108 may monitor for the presence of the device registration module 128 over the wireless network broadcast from the wireless network access point 120. In some implementations, the device registration module 128 may include a web server that is embedded in (e.g., executing on) the headless device 106. At 1210, on detecting the presence of the device registration module 128 over the wireless network, the configuration application 108 may connect to the device registration module 128 and receive data from the device registration module 128. Alternatively, the user 104 may indicate to the configuration application 108 that the user device 102 has been connected to the wireless network broadcast from the headless device 106. The received data may include the network availability information 124 as described above. In some cases, the received data may also include an identification of the headless device 106 such as the device description 204 (e.g., a device name or ID number).

In some implementations, the data may be received in response to a request for the data sent by the configuration application 108. For example, in cases where the configuration application 108 is a web application the request may be sent as a HTTP or HTTPS request. As described above with reference to FIG. 8, the request may include headers for requesting CORS. Such a CORS request 806 may comply with same-origin expectation policies implemented by the embedded web server of the device registration module 128. The CORS request 806 may ask permission of the embedded web server to deliver content that originated from another domain, e.g., from the distributed computing device(s) 110.

In some implementations, the network connection established between the user device 102 and the wireless network access point 120 may be an isolated network that connects the user device 102 and the headless device 106 and that may not connect other devices. Accordingly, the network may be described as a peer-to-peer network involving the user device 102 and the headless device 106. In some cases, the communications over this network may occur between a network interface of the user device 102 and the wireless network access point 120, and may not be routed through additional (e.g., intermediary) devices such as hubs, routers, or other network appliances that span or bridge different subnets of a network. For example, in the non-routed network that connects the user device 102 and the headless device 106 the information sent from the user device 102 may be received at the headless device 106 without passing through any other devices, and the information sent from the headless device 106 may be received at the user device 102 without passing through any other devices. Further, in some implementations the network that connects the user device 102 and the headless device 106 may be non-routable. For example, the IP addresses of the network interfaces of the user device 102 and the headless device 106 may be within a same subnet of the IP (e.g., IP version 4) address space such as 192.168.0.0 through 192.168.255.255. Accordingly, the addresses of the user device 102 and the headless device 106 may not be processed through network address translation (NAT) by a network proxy, router, and so forth.

In some implementations, the user device 102 and the headless device 106 may be located in proximity to one another. For example, the network interface of the user device 102 may be within a signal range of the wireless network transmitted by the wireless network access point 120 (or within the range of at least one wireless network repeater that rebroadcasts the wireless network) and able to detect the network signal transmitted by the wireless network access point 120. In some cases, the user device 102 and the headless device 106 may also be proximate to each other such that both devices are within a signal range of the local wireless network access point 1202 (or within the range of at least one wireless network repeater that rebroadcasts the network) and thus able to connect to the WLAN provided by the local wireless network access point 1202. In some cases, the user device 102 and the headless device 106 may be located within a same room, home, office, building, or other structure, or within a predetermined threshold range of one another.

Although the examples herein may describe the user device 102 and the headless device 106 as communicating over a wireless network that complies with a version of the IEEE 802.11 standard, implementations are not so limited. Implementations also support communications between the user device 102 and the headless device 106 over other types of wireless networks, such as a network that conforms to a version of the Bluetooth™ standard managed by the Bluetooth Special Interest Group, or a network that confirms to protocols and formats for any Near Field Communication (NFC) standard. Implementations also support communications between the user device 102 and the headless device 106 through audio, optical signals, or other means. Optical signals may include signals in any frequency range, including but not limited to infrared signals or signals in the visible light spectrum. In some cases, the user device 102 and the headless device 106 may communicate over any type of wired connection.

On receiving the data sent from the device registration module 128 at 1210, at 1212 the configuration application 108 may present the data in one or more UI elements of the configuration application 108. For example, the received data may include the network availability information 124 that is presented in the configuration application interface 110 as shown in FIG. 2. In some implementations wherein the configuration application 108 is a web application, the data received at 1210 may be integrated with, incorporated with, or otherwise presented within the UI elements of the configuration application 108 that are already loaded in a web browser. In some cases, the data received at 1210 may be presented within one or more UI elements of the configuration application 108 using Asynchronous JavaScript and XML (AJAX), HTML sockets, JSON, or other techniques. Such techniques may enable data to be presented within the UI elements of a web page without otherwise substantially changing the arrangement of the UI elements. The data displayed in one or more UI elements of the web page may be modified without otherwise substantially changing the arrangement of the UI elements, such as their relative positions, size, and orientations. For example, the data received at 1210 may be used to populate a list control (e.g., a list box) from which the user 104 may select one or more portions of the data. The UI elements of the configuration application 108 may include any number or type of Graphical User Interface (GUI) controls or widgets that present data or enable the user 104 to input data to the configuration application 108.

In some implementations, the data received at 1210 may be incorporated into one or more UI elements of the configuration application 108 without reloading at least a portion of the configuration application 108 in a web browser on the user device 102. For example, the configuration application 108 may be described using a Document Object Model (DOM) which presents a hierarchical arrangement of the objects (e.g., UI elements or controls) of the configuration application 108. In such cases, the data may be incorporated into one or more objects without reloading at least a portion of the DOM in the web browser, e.g., without reloading the topmost, document object of the DOM in the web browser. Accordingly, the arrangement of the UI elements of the configuration application 108 may remain consistent (e.g., from the perception of the user 104) while the data is presented. In some cases, the data may be sent from the device registration module 128 in a JSON format.

At 1214, the configuration application 108 may send data to the device registration module 128 on the headless device 106. In some cases, the data sent may include the network credential(s) 126, or other information for configuring the headless device 106. The data sent may also include the token 118. In some implementations, the data may be sent in a JSON format. The data sent at 1214 may include data that is determined by the configuration application 108. For example, the sent data may include the network credential(s) 126 of the wireless network selected by the user 104 based on the network availability information 124 presented in the configuration application 108.

At 1216, on receiving the network credential(s) 126 or other data sent from the configuration application 108, the device registration module 128 may connect to the wireless network indicated by the SSID included in the network credential(s) 126. In some cases, the device registration module 128 may connect to the wireless network provided by the local wireless network access point 1202. The headless device 106 may then employ the wireless connection to communicate with other devices such as the distributed computing device(s) 112, and perform operations such as the registration operations described with reference to FIG. 9. In some cases, the device registration module 128 may also send an instruction to disable the wireless network access point 120, such that the wireless network access point 120 terminates its wireless network broadcast from the headless device 106.

After the wireless network broadcast from the headless device 106 is disabled, the user device 102 may lose its connection over that network to the headless device 106. The user device 102 may then re-establish a network connection to the network that it was previously connected to, such as the network over which it received the configuration application 108 at 1206. At 1218, the user device 102 may reconnect to the configuration and registration service module 116 on the distributed computing device(s) 112 using the re-established network connection or using a different network connection. The configuration and registration service module 116 may then provide, to the user device 102, the status information 136 or other data that is presented in the configuration application 108.

By presenting the data received from the headless device 106 within the user interface of the configuration application 108 served from the distributed computing device(s) 112, implementations enable changes to be made to the appearance, behavior, or other user experience elements of the configuration application 108 without updating the software executing on the headless device 106, e.g., without updating the firmware of the headless device 106. For example, the configuration application 108 may be updated to implement new features, modify existing features, or provide for the localization or internationalization of the configuration application 108 to support different languages.

The above examples may describe at least two network connections involving the user device 102, including the network connection to the wireless network access point 120 and the network connection to the distributed computing device(s) 112 (e.g., over the local wireless access point 1202). In some cases, the network connections may be sequential in that the user device 102 first connects to the distributed computing device(s) 112, then connects to the headless device 106, and so forth, with one network connection being active at any time. Alternatively, the network connections may be concurrent in that the user device 102 may maintain its network connection to the distributed computing device(s) 112 while communicating over another network connection to the headless device 106. Similarly, the network connections connecting the headless device 106 with the user device 102 and the distributed computing device(s) 112 may be sequential or concurrent.

The various devices of the environment 1200 may communicate with one another using one or more networks. Such networks may include public networks such as the Internet, private networks such as an institutional or personal intranet, or some combination of private and public networks. The networks may include any type of wired or wireless network, including but not limited to LANs, WANs, WWANs, WLANs, mobile communications networks (e.g. 3G, 4G, etc.), and so forth. In some implementations, communications between the various devices in the environment 1200 may be encrypted or otherwise secured. For example, such communications may employ one or more public or private cryptographic keys, ciphers, digital certificates, or other credentials supported by a security protocol, such as any version of the SSL or the TLS protocol.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
    establishing, at a user device, a first network connection over a first network between the user device and a server;
    receiving, at the user device, one or more user interface elements of a web application from the server;
    executing, at the user device, the one or more user interface elements of the web application;
    establishing, at the user device, a second network connection over a second network between the user device and a computing device using a network interface of the computing device, the network interface configured to operate as a wireless access point in the computing device, the second network being a non-routed network;
    sending, by the user device, a token to the computing device over the second network connection, the token including information that identifies a user and indicates that the user is authenticated with one or more services executing on the server, wherein the token is used by the computing device to establish a third network connection to communicate the token to a registration service executing on one or more remote devices, and wherein the token is validated by the registration service and a registration key is communicated to the computing device over the third network connection;
    based on the validated token, accessing, at the user device, first data communicated over the second network connection from the computing device, the first data including network availability information describing one or more wireless networks detected at the computing device;
    presenting, at the user device, the first data using the one or more user interface elements of the web application;
    employing, at the user device, the web application to determine second data including one or more network credentials of a wireless network that is employable for network communication by the computing device; and
    employing, at the user device, the second network connection to communicate the second data from the user device to the computing device.

2. The method of claim 1, further comprising:
    accessing, at the user device, third data communicated over the first network connection from the server to the user device; and
    presenting the third data in the web application.

3. The method of claim 1, wherein at least one of the first data or the second data is communicated over the second network connection in a format that complies with a version of JavaScript Object Notation (JSON) standard.

4. The method of claim 1, wherein the presenting of the first data employs one or more of:
   an Asynchronous JavaScript and XML (AJAX) technique;
   a Hypertext Markup Language (HTML) socket; or
   a version of JavaScript Object Notation (JSON) standard.

5. A system, comprising:
   a first device configured to:
      establish a first network connection over a first network between the first device and one or more remote devices;
      receive one or more user interface elements of at least one web page from the one or more remote devices;
      load the one or more user interface elements of the at least one web page, the one or more user interface elements described using a markup language;
      establish a second network connection over a second network between the first device and a second device;
      send a token to the second device over the second network connection, the token includes information that identifies a user as being authenticated to one or more services executing on the one or more remote devices;
      access first data communicated over the second network connection from the second device;
      present the first data in the one or more user interface elements;
      employ the at least one web page to determine second data; and
      employ the second network connection to communicate the second data from the first device to the second device;
   the second device is further configured to:
      employ a third network connection to communicate the token to a registration service executing on the one or more remote devices; and
      access a registration key communicated from the registration service over the third network connection, the registration key indicating that the registration service validated the token to register the second device.

6. The system of claim 5, wherein the second network is provided by a network interface of the second device, the network interface configured to operate as a wireless access point in the second device.

7. The system of claim 5, wherein at least one of the first data or the second data is communicated over the second network connection in a format that complies with a version of JavaScript Object Notation (JSON) standard.

8. The system of claim 5, wherein the presenting of the first data employs one or more of:
   an Asynchronous JavaScript and XML (AJAX) technique;
   a Hypertext Markup Language (HTML) socket; or
   a version of JavaScript Object Notation (JSON) standard.

9. The system of claim 5, wherein the second network complies with a version of one or more of:
   an Institute of Electrical and Electronics Engineers (IEEE) 802.11 standard;
   a Bluetooth wireless communication standard; or
   a Near Field Communication (NFC) standard.

10. The system of claim 5, wherein:
    the first device includes a first input capability; and
    the second device includes a second input capability different from the first input capability.

11. The system of claim 5, wherein:
    the second data is communicated to a web server executing on the second device; and
    the second data is communicated in a Hypertext Transport Protocol (HTTP) request comprising a header that includes a cross origin resource sharing (CORS) request.

12. The system of claim 5, wherein:
    the first data includes network availability information describing one or more wireless networks detected at the second device;
    the second data includes one or more network credentials of a wireless network that is employable for network communication by the second device; and
    the second device is configured to establish the third network connection over the wireless network based on the one or more network credentials.

13. The system of claim 12, wherein:
    the second device is further configured to:
       employ the registration key to encrypt one or more subsequent communications between the second device and the one or more remote devices.

14. The system of claim 5, wherein the second network connection is automatically established between the first device and the second device using a network identifier of the second network, the network identifier described in the at least one web page.

15. One or more non-transitory computer-readable media storing instructions which, when executed by at least one processor, instruct the at least one processor to perform actions comprising:
    establishing, at a first device, a first network connection over a first network between the first device and one or more remote devices;
    receiving, at the first device, one or more user interface elements of an application from the one or more remote devices;
    presenting, on the first device, the application including the one or more user interface elements;
    establishing a second network connection over a second network between the first device and a second device;
    sending a token to the second device over the second network connection, the token includes information that identifies a user as being authenticated to one or more services executing on the one or more remote devices, wherein the token is used by the second device to establish a third network connection to communicate the token to a registration service executing on the one or more remote devices, and wherein the token is validated by the registration service and a registration key is communicated to the second device over the third network connection;
    based on the validated token, accessing first data communicated over the second network connection from the second device;
    presenting the first data in the one or more user interface elements without reloading a top object of a Document Object Model (DOM) of the application;
    employing the application to determine second data; and
    employing the second network connection to communicate the second data from the first device to the second device.

16. The one or more non-transitory computer-readable media of claim 15, wherein:
   the second network connection is established using a network interface of the second device; and
   the network interface is configured to operate as a wireless access point in the second device.

17. The one or more non-transitory computer-readable media of claim 15, wherein at least one of the first data or the second data is communicated over the second network connection in a format that complies with a version of JavaScript Object Notation (JSON) standard.

18. The one or more non-transitory computer-readable media of claim 15, wherein the presenting of the first data employs one or more of:
   an Asynchronous JavaScript and XML (AJAX) technique;
   a Hypertext Markup Language (HTML) socket; or
   a version of JavaScript Object Notation (JSON) standard.

19. The one or more non-transitory computer-readable media of claim 15, wherein the second network complies with a version of one or more of:
   an Institute of Electrical and Electronics Engineers (IEEE) 802.11 standard;
   a Bluetooth wireless communication standard; or
   a Near Field Communication (NFC) standard.

20. The one or more non-transitory computer-readable media of claim 15, wherein the one or more user interface elements are described in a markup language that includes a version of one or more of Hypertext Markup Language (HTML), Dynamic HTML (DHTML), Extensible HTML (XHTML), or Extensible Markup Language (XML).

* * * * *